United States Patent
Gardner et al.

(10) Patent No.: US 6,704,327 B1
(45) Date of Patent: Mar. 9, 2004

(54) SYSTEM AND METHOD FOR CONNECTING A CALL

(75) Inventors: Michael Joseph Gardner, Leawood, KS (US); Tracy Lee Nelson, Shawnee Mission, KS (US); William Lyle Wiley, Overland Park, KS (US); Joseph Michael Christie, deceased, late of San Bruno, CA (US); by Joseph S. Christie, legal representative, Mt. Pleasant, PA (US); by Jean M. Christie, legal representative, Mt. Pleasant, PA (US); Albert Daniel DuRee, Independence, MO (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 08/853,843

(22) Filed: May 9, 1997

(Under 37 CFR 1.47)

(51) Int. Cl.[7] .............................................. H04L 12/56
(52) U.S. Cl. .................................. 370/467; 370/395.1
(58) Field of Search ................................. 370/465, 466, 370/467, 395.1, 384, 385, 396, 397, 401, 474; 379/350, 230, 229, 231

(56) References Cited

U.S. PATENT DOCUMENTS

| 4,201,889 A | 5/1980 | Lawrence et al. |
| 4,310,727 A | 1/1982 | Lawser |

(List continued on next page.)

FOREIGN PATENT DOCUMENTS

| DE | 4225203 A1 | 12/1992 |
| EP | 0403414 A2 | 12/1990 |
| EP | 0426911 A1 | 5/1991 |
| EP | 90312739.7 | 7/1991 |
| EP | 91303312.2 | 10/1991 |
| EP | 0460843 A2 | 12/1991 |
| EP | 0466078 A2 | 1/1992 |
| EP | 0482773 A1 | 4/1992 |
| EP | 91311342.9 | 7/1992 |
| EP | 0539016 A2 | 4/1993 |
| EP | 0549016 A1 | 6/1993 |
| EP | 92307752.3 | 9/1993 |
| EP | 0582418 A2 | 2/1994 |
| EP | 0592152 A2 | 4/1994 |
| EP | 592153 A2 | 4/1994 |
| EP | 592154 A2 | 4/1994 |
| JP | 870284896 | 5/1989 |

(List continued on next page.)

OTHER PUBLICATIONS

ANSI–TI.111–1992, American National Standard for Telecommunications, "Signaling System No. 7 (SS7)—Message Transfer Part (MTP)," New York, NY.

(List continued on next page.)

Primary Examiner—Ken Vanderpuye

(57) ABSTRACT

A system and method for connecting a call in an asynchronous transfer mode system remotely controls an interworking unit. A communication device transports user communications and call signaling for a call. A signaling processor processes the call signaling to determine a connection for the call. An interworking unit interworks the user communications from the format in which the user communications are received from the communication device to asynchronous transfer mode cells that identify the selected connection. A cross connect provisions a virtual path between the signaling processor and the interworking unit. The virtual path has signaling virtual path identifier/virtual channel identifier links. The signaling processor transports over the virtual path a control message that designates the selected connection. The interworking unit receives the control message and interworks the user communications to the asynchronous transfer mode cells that identify the selected connection.

18 Claims, 9 Drawing Sheets

U.S. PATENT DOCUMENTS

| | | |
|---|---|---|
| 4,348,554 A | 9/1982 | Asmuth |
| 4,453,247 A | 6/1984 | Suzuki et al. |
| 4,554,659 A | 11/1985 | Blood et al. |
| 4,565,903 A | 1/1986 | Riley |
| 4,683,563 A | 7/1987 | Rouse et al. |
| 4,720,850 A | 1/1988 | Oberlander |
| 4,730,312 A | 3/1988 | Johnson |
| 4,736,364 A | 4/1988 | Basso et al. |
| 4,748,658 A | 5/1988 | Gopal et al. |
| 4,763,317 A | 8/1988 | Lehman |
| 4,823,338 A | 4/1989 | Chan et al. |
| 4,853,955 A | 8/1989 | Thorn et al. |
| 4,896,319 A | 1/1990 | Lidinsky et al. |
| 4,916,690 A | 4/1990 | Barri |
| 4,926,416 A | 5/1990 | Weik |
| 4,985,889 A | 1/1991 | Frankish et al. |
| 4,991,204 A | 2/1991 | Yamamoto et al. |
| 4,993,014 A | 2/1991 | Gordon |
| 5,003,584 A | 3/1991 | Benyacar et al. |
| 5,018,191 A | 5/1991 | Catron et al. |
| 5,036,318 A | 7/1991 | Bachhuber et al. |
| 5,048,081 A | 9/1991 | Gavaras et al. |
| 5,058,104 A | 10/1991 | Yonehara et al. |
| 5,067,123 A | 11/1991 | Hyodo et al. |
| 5,073,890 A | 12/1991 | Danielsen |
| 5,084,867 A | 1/1992 | Tachibana et al. |
| 5,086,461 A | 2/1992 | Thorn et al. |
| 5,089,954 A | 2/1992 | Rago |
| 5,091,903 A | 2/1992 | Schrodi |
| 5,101,404 A | 3/1992 | Kunimoto et al. |
| 5,115,427 A | 5/1992 | Johnson, Jr. et al. |
| 5,115,431 A | 5/1992 | Williams et al. |
| 5,163,057 A | 11/1992 | Grupp |
| 5,168,492 A | 12/1992 | Beshai et al. |
| 5,179,556 A | 1/1993 | Turner |
| 5,182,550 A | 1/1993 | Masuda et al. |
| 5,185,743 A | 2/1993 | Murayama et al. |
| 5,193,110 A | 3/1993 | Jones et al. |
| 5,204,857 A | 4/1993 | Obara |
| 5,216,669 A | 6/1993 | Hofstetter et al. |
| 5,218,602 A | 6/1993 | Grant et al. |
| 5,231,631 A | 7/1993 | Buhrke et al. |
| 5,231,633 A | 7/1993 | Hluchyj et al. |
| 5,233,607 A | 8/1993 | Barwig et al. |
| 5,239,539 A | 8/1993 | Uchida et al. |
| 5,239,542 A | 8/1993 | Breidenstein et al. |
| 5,249,178 A | 9/1993 | Kurano et al. |
| 5,251,255 A | 10/1993 | Epley |
| 5,253,247 A | 10/1993 | Hirose et al. |
| 5,255,266 A | 10/1993 | Watanabe et al. |
| 5,258,752 A | 11/1993 | Fukaya et al. |
| 5,258,979 A | 11/1993 | Oomuro et al. |
| 5,268,895 A | 12/1993 | Topper |
| 5,271,010 A | 12/1993 | Miyake et al. |
| 5,274,680 A | 12/1993 | Sorton et al. |
| 5,278,889 A | 1/1994 | Papanicolaou et al. |
| 5,282,244 A | 1/1994 | Fuller et al. |
| 5,285,441 A | 2/1994 | Bansal et al. |
| 5,289,536 A | 2/1994 | Hokari |
| 5,291,479 A | 3/1994 | Vaziri et al. |
| 5,291,492 A | 3/1994 | Andrews et al. |
| 5,306,318 A | 4/1994 | Carius et al. |
| 5,311,509 A | 5/1994 | Heddes et al. |
| 5,317,562 A | 5/1994 | Nardin et al. |
| 5,323,389 A | 6/1994 | Bitz et al. |
| 5,327,421 A | 7/1994 | Hiller et al. |
| 5,327,433 A | 7/1994 | Hall |
| 5,329,308 A | 7/1994 | Binns et al. |
| 5,339,318 A | 8/1994 | Tanaka et al. |
| 5,345,443 A | 9/1994 | D'Ambrogio et al. |
| 5,345,445 A | 9/1994 | Hiller et al. |
| 5,345,446 A | 9/1994 | Hiller et al. |
| 5,357,510 A | 10/1994 | Norizuki et al. |
| 5,363,433 A | 11/1994 | Isono |
| 5,365,524 A | 11/1994 | Hiller et al. |
| 5,367,566 A | 11/1994 | Moe et al. |
| 5,373,504 A | 12/1994 | Tanaka et al. |
| 5,375,124 A | 12/1994 | D'Ambrogio et al. |
| 5,377,186 A | 12/1994 | Wegner et al. |
| 5,384,771 A | 1/1995 | Isidoro et al. |
| 5,384,840 A | 1/1995 | Blatchford et al. |
| 5,392,402 A | 2/1995 | Robrock |
| 5,394,393 A | 2/1995 | Brisson et al. |
| 5,394,398 A | 2/1995 | Rau |
| 5,414,701 A | 5/1995 | Shtayer et al. |
| 5,418,783 A | 5/1995 | Yamaki et al. |
| 5,420,857 A | 5/1995 | Jurkevich |
| 5,420,858 A | 5/1995 | Marshall et al. |
| 5,420,916 A | 5/1995 | Sekiguchi |
| 5,422,882 A | 6/1995 | Hiller et al. |
| 5,425,090 A | 6/1995 | Orriss |
| 5,426,636 A | 6/1995 | Hiller et al. |
| 5,428,607 A | 6/1995 | Hiller et al. |
| 5,428,609 A | 6/1995 | Eng et al. |
| 5,434,852 A | 7/1995 | La Porta et al. |
| 5,434,981 A | 7/1995 | Lenihan et al. |
| 5,440,563 A | 8/1995 | Isidoro et al. |
| 5,444,713 A | 8/1995 | Backaus et al. |
| 5,446,738 A | 8/1995 | Kim et al. |
| 5,452,296 A | 9/1995 | Shimizu |
| 5,452,297 A | 9/1995 | Hiller et al. |
| 5,453,981 A | 9/1995 | Katsube et al. |
| 5,454,034 A | 9/1995 | Martin |
| 5,457,684 A | 10/1995 | Bharucha et al. |
| 5,459,721 A | 10/1995 | Yoshida |
| 5,461,669 A | 10/1995 | Vilain |
| 5,463,620 A | 10/1995 | Sriram |
| 5,463,621 A | 10/1995 | Suzuki |
| 5,469,501 A | 11/1995 | Otsuka |
| 5,473,677 A | 12/1995 | D'Amato et al. |
| 5,473,679 A | 12/1995 | La Porta et al. |
| 5,477,537 A | 12/1995 | Dankert et al. |
| 5,479,401 A | 12/1995 | Bitz et al. |
| 5,479,402 A | 12/1995 | Hata et al. |
| 5,479,495 A | 12/1995 | Blumhardt |
| 5,483,527 A * | 1/1996 | Doshi et al. ................ 370/447 |
| 5,485,455 A | 1/1996 | Dobbins et al. |
| 5,495,484 A | 2/1996 | Self et al. |
| 5,504,742 A | 4/1996 | Kakuma et al. |
| 5,506,844 A | 4/1996 | Rao |
| 5,509,010 A | 4/1996 | La Porta et al. |
| 5,509,123 A | 4/1996 | Dobbins et al. |
| 5,513,178 A | 4/1996 | Tanaka |
| 5,513,180 A | 4/1996 | Miyake et al. |
| 5,519,707 A | 5/1996 | Subramanian et al. |
| 5,521,910 A | 5/1996 | Matthews |
| 5,522,042 A | 5/1996 | Fee et al. |
| 5,526,359 A | 6/1996 | Read et al. |
| 5,526,414 A | 6/1996 | Bedard et al. |
| 5,530,698 A | 6/1996 | Kozaki et al. |
| 5,530,724 A | 6/1996 | Abrams et al. |
| 5,533,106 A | 7/1996 | Blumhardt |
| 5,539,698 A | 7/1996 | Suzuki |
| 5,539,815 A | 7/1996 | Samba |
| 5,539,816 A | 7/1996 | Pinard et al. |
| 5,539,884 A | 7/1996 | Robrock, II |
| 5,541,917 A | 7/1996 | Farris |
| 5,541,918 A | 7/1996 | Ganmukhi et al. |
| 5,541,926 A | 7/1996 | Saito et al. |
| 5,544,152 A | 8/1996 | Obermanns et al. |
| 5,544,161 A | 8/1996 | Bigham et al. |
| 5,548,580 A | 8/1996 | Buckland |
| 5,550,819 A | 8/1996 | Duault |
| 5,550,914 A | 8/1996 | Clarke et al. |
| 5,563,939 A | 10/1996 | La Porta et al. |
| 5,566,173 A | 10/1996 | Steinbrecher |
| 5,568,475 A | 10/1996 | Doshi et al. |
| 5,570,368 A | 10/1996 | Murakami et al. |
| 5,577,039 A | 11/1996 | Won et al. |
| 5,579,311 A | 11/1996 | Chopping et al. |

| | | |
|---|---|---|
| 5,583,849 A | 12/1996 | Ziemann et al. |
| 5,587,999 A | 12/1996 | Endo |
| 5,592,477 A | 1/1997 | Farris et al. |
| 5,600,640 A | 2/1997 | Blair et al. |
| 5,600,643 A | 2/1997 | Robrock, II |
| 5,623,491 A | 4/1997 | Skoog |
| 5,627,836 A | 5/1997 | Conoscenti et al. |
| 5,629,930 A | 5/1997 | Beshai et al. |
| 5,629,938 A | 5/1997 | Cerciello et al. |
| 5,635,980 A | 6/1997 | Lin et al. |
| 5,636,210 A | 6/1997 | Agrawal et al. |
| 5,640,446 A | 6/1997 | Everett et al. |
| 5,661,725 A | 8/1997 | Buck |
| 5,666,349 A | 9/1997 | Petri |
| 5,673,262 A | 9/1997 | Shimizu |
| 5,680,390 A | 10/1997 | Robrock, II |
| 5,703,876 A | 12/1997 | Christie |
| 5,708,702 A | 1/1998 | DePaul et al. |
| 5,710,769 A | 1/1998 | Anderson et al. |
| 5,719,863 A | 2/1998 | Hummel |
| 5,748,636 A * | 5/1998 | Gradischnig ............... 370/469 |
| 5,751,706 A | 5/1998 | Land |
| 5,765,108 A | 6/1998 | Martin et al. |
| 5,784,371 A | 7/1998 | Iwai |
| 5,802,045 A | 9/1998 | Kos |
| 5,805,568 A | 9/1998 | Shinbashi |
| 5,818,919 A * | 10/1998 | Berberich, Jr. et al. ..... 379/211 |
| 5,825,780 A | 10/1998 | Christie |
| 5,844,895 A * | 12/1998 | Gradisching ............... 370/385 |
| 5,848,128 A * | 12/1998 | Frey .............................. 379/9 |
| 5,867,571 A * | 2/1999 | Borchering ................. 379/230 |
| 5,889,773 A | 3/1999 | Stevenson, III |
| 5,889,782 A | 3/1999 | Dendi |
| 5,889,848 A | 3/1999 | Cookson |
| 5,917,815 A | 6/1999 | Byers et al. |
| 5,920,562 A * | 7/1999 | Christie et al. |
| 5,926,482 A | 7/1999 | Christie |
| 5,940,487 A | 8/1999 | Bunch et al. |
| 5,940,491 A * | 8/1999 | Anderson et al. ........... 379/230 |
| 5,953,338 A | 9/1999 | Ma |
| 5,991,301 A * | 11/1999 | Christie |
| 6,005,845 A | 12/1999 | Svennesson et al. |
| 6,009,100 A * | 12/1999 | Gausmann et al. ......... 370/397 |
| 6,016,319 A | 1/2000 | Kshirsagar et al. |
| 6,016,343 A | 1/2000 | Hogan et al. |
| 6,023,474 A | 2/2000 | Gardner |
| 6,026,086 A | 2/2000 | Lancelot et al. |
| 6,026,091 A * | 2/2000 | Christie et al. ............. 370/395 |
| 6,081,529 A | 6/2000 | Christie |
| 6,324,179 B1 | 11/2001 | Doshi et al. |

FOREIGN PATENT DOCUMENTS

| | | |
|---|---|---|
| JP | 07050057 | 9/1996 |
| WO | WO 93/18598 | 9/1993 |
| WO | WO 94/05121 | 3/1994 |
| WO | WO 94/06251 | 3/1994 |
| WO | WO 94/28660 | 12/1994 |
| WO | WO 95/04436 | 2/1995 |
| WO | WO 95/08881 | 3/1995 |

OTHER PUBLICATIONS

ANSI–TI.112–1992, American National Standard for Telecommunications, "Signaling System No. 7 (SS7)—Signaling Connection Control Part (SCCP)," New York, NY.

ANSI–TI.113–1992, American National Standard for Telecommunications, "Signaling System No. 7 (SS7)—Integrated Services Digital Network (ISDN) User Part," New York, NY.

Choi, Requirements For ATM Trunking, ATM Forum Technical Committee 95–1401, Oct. 2–6, 1995.

B–ISDN ATM Adaptation Layer (AAL) Specification, Types 1 And 2, Draft Recommendation I.363.1. Temporary Document TD.53[P], Jul. 10–21, 1995.

Stodola "Circuit Emulation Services Version 2 Baseline," ATM Forum Technical Committee 95–1504, Dec. 11–15, 1995.

Okutani et. al. "VTOA: Reference Configuration—ATM Trunking For Narrowband Services," ATM Forum Technical Committee 95–1364, Oct. 2–6, 1995.

Ohta, S., et al., A Dynamically Controllable ATM Transport Network Based On The Virtual Path Concept, pp. 1272–1276, Communications For The Information Age, Globecom '88, Conference Record, vol. III, Nov. 28–Dec. 1, 1988.

Stodola, "Signaling And Management Input To DS3/E3 Circuit Emulation Baseline", ATM Forum Technical Committee, 95–1183, Oct. 2–6, 1995.

Schink, "CES As A Flexible Trunking Method", ATM Forum Technical Committee 95–1157, Oct. 2–6, 1995.

Yoneda, "J2 Circuit Emulation Service—Proposal For Changes/Additions To Circuit Emulation Service Interoperability Specification", ATM Forum Technical Committee 95–1136, Oct. 2–6, 1995.

Caves, Proposed modifications to the baseline text (95–0446R2) of the "VTOA—ATM Trunking For Narrowband Services" Specification, ATM Forum Technical Committee 95–1134, Oct. 2–6, 1995.

Chase, "Voice And Telephony Over ATM Meeting Report Toronto, Canada Aug. 7–11, 1995", ATM Forum Technical Committee 95–1109, Oct. 2–6, 1995.

Caves, "ATM Trunking: Network Delay And Echo Control Issues", ATM Forum Technical Committee 95–1135, Oct. 2–6, 1995.

Duault, "Baseline Text For Voice And Telephony Over ATM–ATM Trunking For Narrowband Services", ATM Forum Technical Committee 95–0446R3, Oct. 2–6, 1995.

Minzer, Steven, A Signaling Protocol For Complex Multimedia Services, pp. 1383–1394, IEEE Journal on Selected Areas in Communications vol. 9, No. 9 (ISSN 0733–8716).

"IN/B–ISDN Signaling Three Ways Of Integration," Study Group 11, Geneva, ITU—Telecommunication Standardization Sector, Nov. 29–Dec. 17, 1993.

"Interworking B–ISUP and Q.93B for DDI, MSN, TP and SUB," Study Group 11, Geneva, ITU—Telecommunication Standardization Sector, Nov. 29–Dec. 17, 1993.

"Draft Broadband/Narrowband NNI Interworking Recommendation," Study Group 11, Geneva, ITU—Telecommunication Standardization Sector, Dec. 1993.

"Clean Final Draft Text For B–ISUP Formats And Codes (Q.2763) In ASN.1," Study Group 11, Geneva, ITU—Telecommunication Standardization Sector, Nov. 29–Dec. 17, 1993.

"Q.2931 Overview," Geneva, ITU—Telecommunication Standardization Sector, Nov. 29–Dec. 17, 1993.

"Final Draft Text For Broadband Capability Set 2 Signaling Requirements," Study Group 11 Attachement "D" Special Drafting Meeting, pp. 1–127, Torino, Italy, ITU–T Telecommunications Standardization Sector, Sep. 13–22, 1993.

"Network Signaling," Telephony, TCX12004, University of Excellence, pp 5.8–5.17, Oct. 21, 1991.

Kuribayashi, Shin–Ichi, "Advanced Signaling Protocol for Broadband ISDN Services" Electronics and Communications in Japan, Part 1, vol. 78, No. 1, 1995, pp. 1–12.

McKinney, Scott, "ATM for Narrowband Services" IEEE Communications Magazine, Apr., 1994, New York, US, pp. 64–72.

Barr, W.J., et al. The TINA Initiative, IEEE Communications Magazine, vol. 31, No. 3, Mar. 1993, New York, pp. 70–76.

Chen, S., et al., Intelligent Network For The Global Marketplace, IEEE Communications Magazine, vol. 31, No. 3, Mar. 1993, New York, pp. 86–92.

Fujioka, M., et al., Hierarchical And Distributed Information Handling For UPT, IEEE Network Magazine, No., 1990.

Garrahan, J.J., et al., "Intelligent Network Overview," pp. 30–36, IEEE Communications Magazine, Mar. 1993.

Gilmour, J., et al. Intelligent Network/2: The Architecture—The Technical Challenges—The Opportunities, IEEE Communications Magazine, vol. 26, No. 12, Dec. 1988, New York, pp. 8–11 and 63.

Weisser, F. J., et al., The Intelligent Network And Forward-Looking Technology, IEEE Communications Magazine, vol. 26, No. 12, Dec. 1988, New York, pp. 64–69.

General Recommendations On Telephone Switching And Signaling Intelligent Network–Intelligent Network Physical Plane Architecture Q.1205, ITU–T Recommendation, Telecommunication Standardization Sector of ITU.

"General Recommendations On Telephone Switching And Signaling—Intelligent Network/Distributed Functional Plane For Intelligent Network CS 1," ITU–T Recommendation Q.1214, ITU–Telecommunication Standardization Sector.

Rec.I.312, "ISDN—Principles Of Intelligent Network Architecture." ITU—Telecommunication Standardization Sector, Oct. 1992.

Rec. Q. 1200. "General Recommendations On Telephone Switching And Signaling–Intelligent Network—Q–Series Intelligent Network Recommendation Structure." ITU–Telecommunication Standardization Sector, Mar. 1993.

Rec. Q. 1218, "General Recommendations On Telephone Switching And Signaling–Intelligent Network–Interface Recommendation For Intelligent Network CS–1." ITU–Telecommunication Standardization Sector, Mar. 1993.

Yoshikai, N., et al., "Report of the Meeting of SWP 13/1–4 (Draft Recommendation I.580)," ITU–T Telecommunication Standardization Sector, Study Group 13, pp. 1–51, (Mar. 7–18, 1994).

N/A, "Final Draft Text for Broadband Capability Set 2 Signaling Requirements, Attachment "D" Special Drafting Meeting," ITU–T Telecommunications Standardization Sector, Study Group 11, p. 1–127, (Sep. 13–22, 1993).

Ohta, S., et al., "A Dynamically Controllable ATM Transport Network Based on the Virtual Path Concept," Communications for the Information Age, Globecom'88, Conference Record, p. 1272–1276, (Nov. 28–Dec. 1, 1988).

Fukazawa, M., et al., "Intelligent Network Call Model for Broadband ISDN," Fujitsu Laboratories, Ltd. (Japan), p. 30.6.1–30.6.5.

Minzer, Steven, "A Signaling Protocol for Complex Multimedia Services," IEEE Journal on Selected Areas in Communications (ISSN 0733–8716), vol. 9 (No. 9), p. 1383–1394, (Dec. 1991).

Faynberg, I., et al., "The Support of Network Interworking and Distributed Context Switching in the IN Service Data Function Model," 2nd Colloque International, ICIN 92, p. 11–16, (Mar. 1992).

Woodworth, Clark B., et al., "A Flexible Broadband Packet Switch for a Multimedia Integrated Network," International Conference on Communications, Denver, ICC–91, p. 3.2.1–3.2.8, (Jun. 1991).

Miller, P., "Intelligent Network/2: A flexible framework for exchange services," Bell Communications Research EXCHANGE, vol. 3 (No. 3), (May/Jun. 1987).

Cooper, C., et al., "Toward a Broadband Congestion Control Strategy," IEEE Network, The Magazine of Computer Communications, (May 1990).

Batten, A., "Personal Communications Services and the Intelligent Network," British Telecommunications Engineering, (Aug. 1990).

Fujioka, M., et al., "Universal Service Creation and Provision Environment for Intelligent Network," IEEE Communications Magazine, (Jan. 1991).

Andrews, F., "Switching in a Competitive Market," IEEE Communications Magazine, (Jan. 1991).

N/A, "Network Signaling," Telephony, TCX12004, Unversity of Excellence, p. 5.8–5.17, (Oct. 21, 1991).

Garrahan, J.J., et al., "Intelligent Network Overview," IEEE Communications Magazine, p. 30–36, (Mar. 1993).

Johnson, M.A., et al., "New Service Testing Functions for Advanced Intelligent Networks," IEEE 1992 Network Operations and Management Symposium, p. 709–720, (Apr. 6, 1992).

Yeh, S.Y., et al., "The Evolving Intelligent Network Architecture," IEEE Conference on Computer and Communication Systems, p. 835–839, (1990).

Atoui, M., "Virtual Private Network Call Processing in the Intelligent Network," International Conference on Communications, p. 561–565, (1992).

Bosco, P., et al., "A Laboratory for AIN Service Design and Validation," International Conference on Communications, p. 566–571, (Jun. 14, 1992).

Homa, J., et al., "Intelligent Network Requirements for Personal Communications Services," IEEE Communications Magazine, p. 70–76, (Feb. 1992).

Russo, E.G., et al., "Intelligent Network Platforms in the U.S.," AT&T Technical Journal, p. 26–43, (1991).

Van Den Broek, W., et al., "RACE 2066–Functional models of UMTS and integration into the future networks," Electronics & Communications Engineering Journal, p. 165–172, (Jun. 1993).

Pinkham, G., et al., "The Ericsson Approach to Intelligent Networks," IEEE Global Telecommunications Conference & Exhibition, Session 10, paragraph 4, p. 320–324, (1988).

N/A, "ANSI–TI.111–1992, Signaling System No. 7 (SS7)—Message Transfer Part (MTP)," American National Standard for Telecommunications.

N/A, "ANSI–TI.112–1992, Signaling System No. 7 (SS7)—Signaling Connection Control Part (SCCP)," American National Standard for Telecommunications.

N/A, "ANSI–TI.113–1992, Signaling System No. 7 (SS7)—Integrated Services digital Network (ISDN) User Part," American National Standard for Telecommunications.

N/A, "ANSI–TI.113a–1993, Signaling System No. 7 (SS7)—Integrated Services Digital Network (ISDN) User Part (NxDSO Multi–rate Connection)," American National Standard for Telecommunications.

N/A, "ANSI–TI.113–1995, Signaling System No. 7 (SS7)—Integrated Services Digital Network (ISDN) User Part," American National Standard for Telecommunications.

N/A, "ATM at a Glance," Transmission Technologies Access Guide, p. 40–42, (1993).

Paglialunga, A., "ISCP Baseline Document (VER 3.1)," ITU Telecommunication Standardization Sector, Centre Studi E Laboratori Telecommunicazioni S.p.A., (1993).

N/A, "A Technical Report on Speech Packetization," Document T1A1/94—Prepared by T1A1.7, Working Group on Specialized Signal Processing.

N/A, "Draft Revised Recommendation I.580," ITU—Telecommunication Standardization Sector, Study Group 13, (Jul. 10–21, 1995).

Sprague, David, "MTP Level–3 Gateway STP Release 3.2.0," TEKELEC, p. 1–48, (Aug. 4, 1995).

McDysan, David E. and Spohn, Darren L., "ATM Theory and Application," ATM Layer VPI/VCI Level Addressing, p. 256: 9.3.1, (1994).

Minoli, Daniel and Dobrowski, George, "Principles of Signaling for Cell Relay and Frame Relay," DVI Comm., Inc./Stevens Institute of Technology/Bell Comm. Research (Bellcore), p. 1–2, 5–6 and 229, (1994).

N/A, "B–IDSN ATM Adaptation Layer (AAL) Specification, Types 1 & 2," ITU Draft Recommendation I.363.1, (Jul. 21, 1995).

N/A, "Circuit Emulation Service Interoperability Specification Version 2.0 (Baseline Draft), 95–1504," The ATM Forum Technical Committee, (Dec. 1995).

N/A, "IN/B–ISDN Signalling Three Ways of Integration," ITU—Telecommunication Standardization Sector, Study Group 11, (Nov. 29–Dec. 17, 1993).

N/A, "Interworking B–ISUP and Q.93B for DDI, MSN, TP and SUB," ITU—Telecommunication Standardization Sector, Study Group 11, (Nov. 29–Dec. 17, 1993).

N/A, "Revised Draft of Q.2650 (DSS2/B–ISUP Interworking Recommendation)," ITU—Telecommunication Standardization Sector, Study Group 11, (Nov. 29–Dec. 17, 1993).

N/A, "Draft Broadband / Narrowband NNI interworking recommendation," ITU—Telecommunication Standardization Sector, Study Group 11, (Dec. 1993).

N/A, "Draft Recommendation Q.2761," ITU—Telecommunication Standardization Sector, Study Group 11, (Nov. 29–Dec. 17, 1993).

N/A, "Draft Recommendation Q.2762," ITU—Telecommunication Standardization Sector, Study Group 11, (Nov. 29–Dec. 17, 1993).

N/A, "Q.2931 Overview," ITU—Telecommunication Standardization Sector, (Nov. 29–Dec. 17, 1993).

N/A, "Clean final draft text for B–ISUP formats and codes (Q.2763) in ASN.1," ITU—Telecommunication Standardization Sector, Study Group 11, (Nov. 29–Dec. 17, 1993).

N/A, "Updated draft of Q.2764 (BQ.764)," ITU—Telecommunication Standardization Sector, Study Group 11, (Nov. 29–Dec. 17, 1993).

N/A, "Final B–ISUP SDLs," ITU—Telecommunication Standardization Sector, Study Group 11, (Nov. 29–Dec. 17, 1993).

N/A, "Draft Recommendation Q.2650," ITU—Telecommunication Standardization Sector, Study Group 11, (Nov. 29–Dec. 17, 1993).

N/A, "Revision of Recommendation of Q.850," ITU—T SG 11 WP 2, (Dec. 2–15, 1993).

N/A, "Draft Text for Q.2931 (CH. 1, 2 and 3)," ITU—Telecommunication Standardization Sector, Study Group 11, (Dec. 1993).

N/A, "Q.2931, Clause 4—Information Elements," ITU—Telecommunication Standardization Sector, (Nov. 29–Dec. 17, 1993).

N/A, "Section 5 of Q.93B," ITU—Telecommunication Standardization Sector, Study Group 11, (Nov. 29–Dec. 17, 1993).

N/A, "Chapter 6 of Recommendation Q.93B," ITU—Telecommunication Standardization Sector, Study Group 11, (Nov. 29–Dec. 17, 1993).

N/A, "Clauses 7 and 8 of Q.2931," ITU—Telecommunication Standardization Sector, Study Group 11, (Dec. 1993).

N/A, "Revised Q.2931 User Side SDL Diagrams," ITU—Telecommunication Standardization Sector, Study Group 11, (Nov. 29–Dec. 17, 1993).

N/A, "Revised Q.2931 Network Side SDL Diagrams," ITU—Telecommunication Standardization Sector, Study Group 11, (Nov. 29–Dec. 17, 1993).

N/A, "AnnexesB, C, D, F, H and I of Q.2931," ITU—Telecommunication Standardization Sector Study Group 11, (Nov. 29–Dec. 17, 1993).

N/A, "Annex E of Recommendation Q.93B," ITU—Telecommunication Standardization Sector, Study Group 11, (Nov. 29–Dec. 17, 1993).

N/A, "Rec. Q.2931, Annex G—Status Monitoring of SPCs," ITU—Telecommunication Standardization Sector, Study Group 11, (Nov. 29–Dec. 17, 1993).

N/A, "Annex J of Q.2931," ITU—Telecommunication Standardization Sector, Study Group 11, (Dec. 1993).

N/A, "Appendix 1/Q.2931:Guidelines for the Use of Instruction Indicators," ITU—Telecommunication Standardization Sector, Study Group 11, (Nov. 29–Dec. 17, 1993).

N/A, "Draft text for Q.2931: Appendex II (Information Items Required for Connection Establishment and Routing in B–ISDN)," ITU—Telecommunication Standardization Sector, Study Group 11.

N/A, "General Recommendations on Telephone Switching and Signalling—Intelligent Network / Distributed Functional Plane for Intelligent Network CS–1," ITU–T Recommendation Q.1214.

Kumar, Sanjay, "Legacy Voice Service at a Native ATM Terminal," ATM_Forum/95–0917R1, ATM Forum Technical Committee, (Oct. 2–6, 1995).

Duault, Maurice, et al., "Baseline Text for Voice and Telephony Over ATM—ATM Trunking for Narrowband Services," ATM_Forum/95–0446R3, ATM Forum Technical Committee, (Oct. 2–6, 1995).

Choi, Don, "Requirements for ATM Trunking," ATM_Forum/95–1401, ATM Forum Technical Committee, (Oct. 2–6, 1995).

Chiang, Chin, "Proposed Changes to Proxy Signaling Capability," ATM Forum/95–0046, ATM Forum: Signaling Working Group, (Feb. 6–10, 1995).

Amin–Salehi, Bahman, "Third Party Call Setup for a Video–on Demand Connection Establishment," ATM_Forum/95–0022, ATM Forum Technical Committee, (Feb. 5–8, 1995).

Caves, Keith, "Proposed Modifications to the Baseline Text (95–0446R2) of the 'VTOA—ATM Trunking for Narrowband Services' Specification," ATM Forum/95–1134, ATM Forum Technical Committee, (Oct. 2–6, 1995).

Schink, Helmut, et al., "CES as a Flexible Trunking Method," ATM_Forum/95–1157, ATM Forum Technical Committee, (Oct. 2–6, 1995).

Duault, Maurice, "Proposal for ATM Trunking Options," ATM_Forum/95–1230, ATM Forum Technical Committee, (Oct. 2–6, 1995).

Okutani, Takenori, et al., "VTOA: Reference Configuration–ATM Trunking for Narrowband Services," ATM–Forum/95–1364, ATM Forum Technical Committee, (Oct. 2–6, 1995).

Stodola, Kevin, "Circuit Emulation Services Version 2 Baseline," ATM_Forum/95–1504, ATM Forum Technical Committee, (Dec. 11–15, 1995).

N/A, "I.751 Asynchronous Transfer Mode (ATM) Management View of the Network Element View," ITU—Telecommunication Standardization Sector, Study Group 15, (Nov. 13–24, 1995).

N/A, "Draft I.732," ITU—Telecommunication Standardization Sector, Study Group 15, (Nov. 13–24, 1995).

N/A, "Editorial Modificaitons for Draft New ITU–T Recommendation I.731," ITU—Telecommunication Standardization Sector, Study Group 15, (Nov. 13–24, 1995).

Buhrke, R.E., "Proposed Unified Functional Model," T1S1.5/95–036, Committee T1 Contribution, (Feb. 1995).

Beckman, Richard T. and Mathews, Joseph R., "Proposal for a Physical Architecture Based on the Harmonized Functional Architecture," T1S1.5/95–027, Commmittee T1 Contribution, (Feb. 20–24, 1995).

Beckman, Richard T. and Matthews, Joseph R., "Proposal for a Physical Architecture Based on the Harmonized Functional Architecture," Committee T1 Contribution T1S1.5/95–027, Bellcore, (Feb. 20, 1995).

Yoshikai, N., et al., "Report of the Meeting of SWP 13/1–4 (Draft Recommendation I.580)," ITU–T Telecommunication Standardization Sector, Study Group 13, pp. 1–51, (Mar. 7–18, 1994).

N/A, "Final Draft Text for Broadband Capability Set 2 Signaling Requirements, Attachment "D" Special Drafting Meeting," ITU–T Telecommunications Standardization Sector, Study Group 11, p. 1–127, (Sep. 13–22, 1993).

Ohta, S., et al., "A Dynamically Controllable ATM Transport Network Based on the Virtual Path Concept," Communications for the Information Age, Globecom'88, Conference Record, p. 1272–1276, (Nov. 28–Dec. 1, 1988).

Fukazawa, M., et al., "Intelligent Network Call Model for Broadband ISDN," Fujitsu Laboratories, Ltd. (Japan), p. 30.6.–30.6.5.

Minzer, Steven, "A Signaling Protocol for Complex Multimedia Services," IEEE Journal on Selected Areas in Communications (ISSN 0733–8716), vol. 9 (No. 9), p. 1383–1394, (Dec. 1991).

Faynberg, I., et al., "The Support of Network Interworking and Distributed Context Switching in the IN Service Data Function Model," 2nd Colloque International, ICIN 92, p. 11–16, (Mar. 1992).

Woodworth, Clark B., et al., "A Flexible Broadband Packet Switch for a Multimedia Integrated Network," International Conference on Communications, Denver, ICC–91, p. 3.2.1–3.2.8, (Jun. 1991).

Miller, P., "Intelligent Network/2: A flexible framework for exchange services," Bell Communications Research EXCHANGE, vol. 3 (No. 3), (May/Jun. 1987).

Cooper, C., et al., "Toward a Broadband Congestion Control Strategy," IEEE Network, The Magazine of Computer Communications, (May 1990).

Batten, A., "Personal Communications Services and the Intelligent Network," British Telecommunications Engineering, (Aug. 1990).

Fujioka, M., et al., "Universal Service Creation and Provision Environment for Intelligent Network," IEEE Communications Magazine, (Jan. 1991).

Andrews, F., "Switching in a Competitive Market," IEEE Communications Magazine, (Jan. 1991).

N/A, "Network Signaling," Telephony, TCX12004, University of Excellence, p. 5.8–5.17, (Oct. 21, 1991).

Garrahan, J.J., et al., "Intelligent Network Overview," IEEE Communications Magazine, p. 30–36, (Mar. 1993).

Johnson, M.A., et al., "New Service Testing Functions for Advanced Intelligent Networks," IEEE 1992 Network Operations and Management Symposium, p. 709–720, (Apr. 6, 1992).

Yeh, S.Y., et al., "The Evolving Intelligent Network Architecture," IEEE Conference on Computer and Communication Systems, p. 835–839, (1990).

Atoui, M., "Virtual Private Network Call Processing in the Intelligent Network," International Conference on Communications, p. 561–565, (1992).

Bosco, P., et al., "A Laboratory for AIN Service Design and Validation," International Conference on Communications, p. 566–571, (Jun. 14, 1992).

Homa, J., et al., "Intelligent Network Requirements for Personal Communications Services," IEEE Communications Magazine, p. 70–76, (Feb. 1992).

Russo, E.G., et al., "Intelligent Network Platforms in the U.S.," AT&T Technical Journal, p. 26–43, (1991).

Van Den Broek, W., et al., "Race 2066–Functional models of UMTS and integration into the future networks," Electronics & Communications Engineering Journal, p. 165–172, (Jun. 1993).

Pinkham, G., et al., "The Ericsson Approach to Intelligent Networks," IEEE Global Telecommunications Conference & Exhibition, Session 10, paragraph 4, p. 320–324, (1988).

Helen A. Bauer, John J. Kulzer, Edward G. Sable, "Designing Service–Independent Capabilities for Intelligent Networks," IEEE, Dec. 1988, pp. 31–41.

ITU–T Q.1219, "Intelligent Network User's Guide For Capability Set 1," Apr., 1994.

Thorner, "Intelligent Networks, Capter 2," 1994, Artech House, pp. 11–107.

ITU–T, Recommendation Q.722, "Specifications of Signalling System No. 7, General Function of Telephone Messages and Signals," 1993.

* cited by examiner

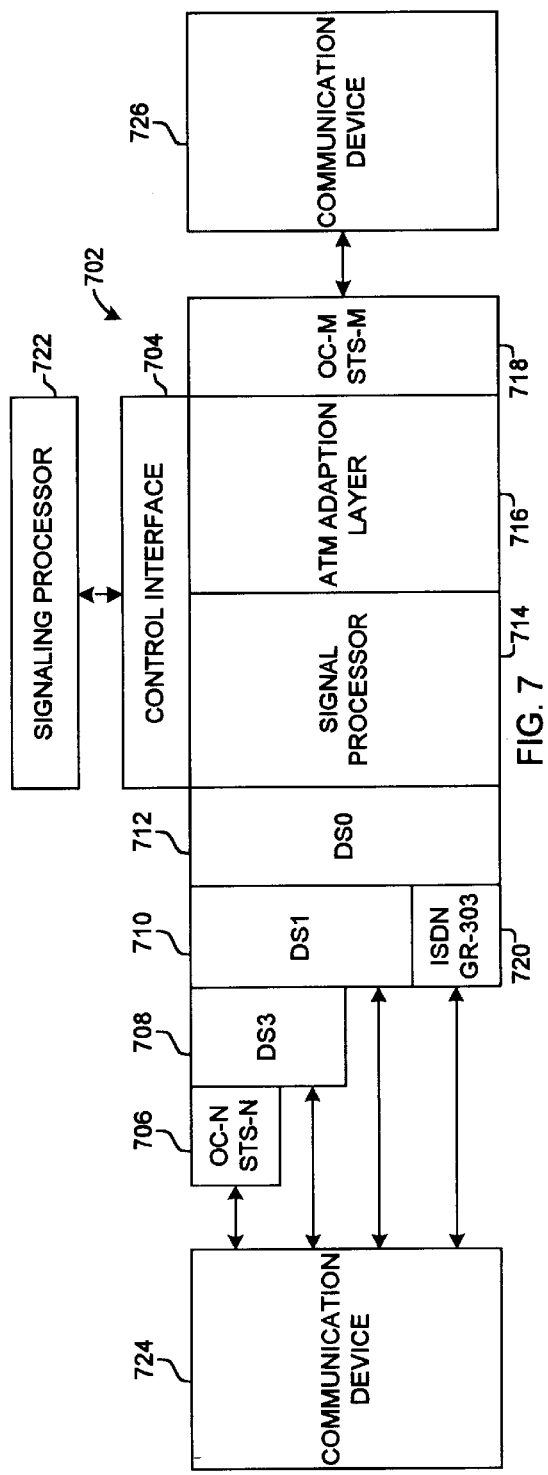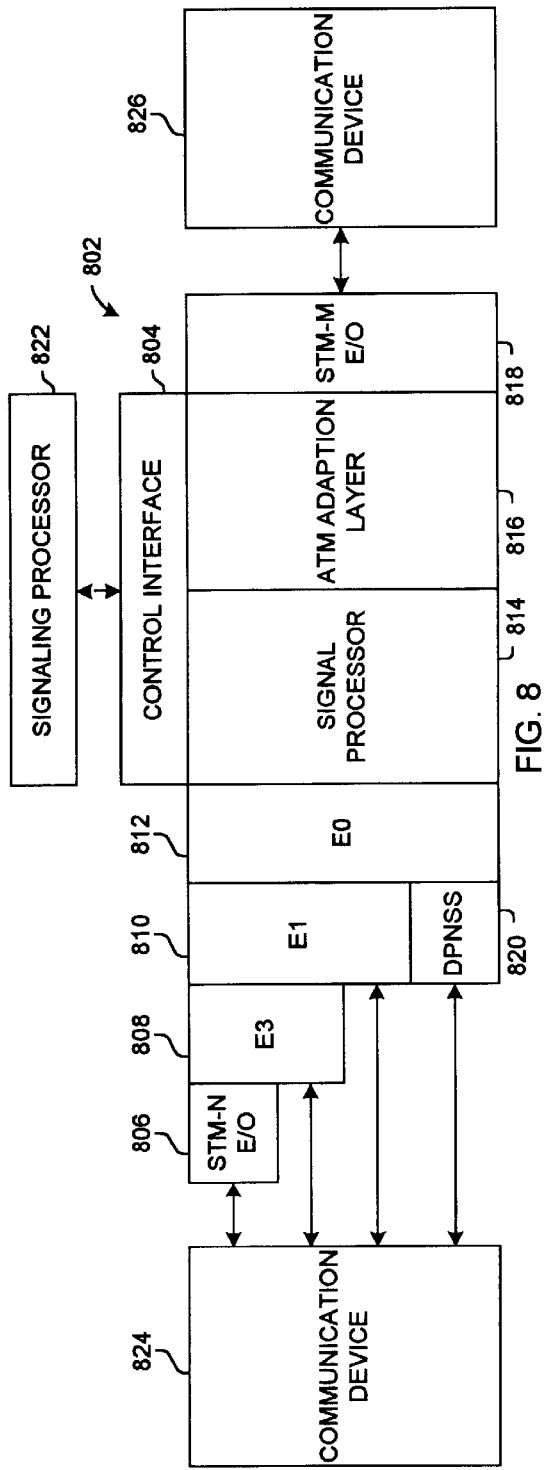

| ASSOCIATED POINT CODE | CIC | VP | VC | TRUNK GROUP NUMBER | GROUP MEMBER NUMBER | HARDWARE IDENTIFIER | ECHO CANCELER | ECHO CONTROL | SATELLITE INDICATOR | CIRCUIT STATUS | CIRCUIT STATE | TIME/ DATE |
|---|---|---|---|---|---|---|---|---|---|---|---|---|
| | | | | | | | | | | | | |
| | | | | | | | | | | | | |
| | | | | | | | | | | | | |

FIG. 12

| TRUNK GROUP NUMBER | GLARE RESOLUTION | CONTINUITY CONTROL | CLLI | SATELLITE TRUNK GROUP | SERVICE INDICATOR | ASSOCIATED NPA | SELECTION SEQUENCE | HOP COUNTER | ACC ACTIVE | OMI | NEXT FUNCTION | INDEX |
|---|---|---|---|---|---|---|---|---|---|---|---|---|
| | | | | | | | | | | | | |
| | | | | | | | | | | | | |
| | | | | | | | | | | | | |

FIG. 13

| EXCEPTION TABLE INDEX | CARRIER SELECTION IDENTIFICATION | CARRIER IDENTIFICATION | NATURE OF ADDRESS | CALLED PARTY | | NEXT FUNCTION | INDEX |
|---|---|---|---|---|---|---|---|
| | | | | DIGITS FROM | DIGITS TO | | |
| | | | | | | | |
| | | | | | | | |
| | | | | | | | |

| ANI TABLE INDEX | CALLING PARTY CATEGORY | NATURE OF ADDRESS | CALLING PARTY/CHARGE NUMBER | | | NEXT FUNCTION | NEXT INDEX |
|---|---|---|---|---|---|---|---|
| | | | DIGITS FROM | DIGITS TO | DATA | | |
| | | | | | ORIGINATING LINE INFORMATION | | |

FIG. 16

| CALLED NUMBER TABLE INDEX | NATURE OF ADDRESS | DIGITS FROM | DIGITS TO | NEXT FUNCTION | NEXT INDEX |
|---|---|---|---|---|---|

FIG. 17

| ROUTING TABLE INDEX | TRANSIT NETWORK SELECTION | | | | | NEXT FUNCTION #1 | INDEX #1 | NEXT FUNCTION #2 | INDEX #2 | NEXT FUNCTION #3 | INDEX #3 |
|---|---|---|---|---|---|---|---|---|---|---|---|
| | NETWORK IDENTIFICATION PLAN | DIGITS FROM | DIGITS TO | CIRCUIT CODE | | | | | | | |

FIG. 18

| INDEX | MESSAGE RECEIVED CAUSE VALUE | GENERAL LOCATION | CODING STANDARD | CAUSE VALUE | NEXT FUNCTION | INDEX |
|---|---|---|---|---|---|---|

| MESSAGE TYPE | PARAMETERS | INDEX #1 | INDEX #.... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | OPTIONAL BACKWARD CALL INDICATORS | | | |
| | OPTIONAL "FE" INDICATOR | | | |
| ANSWER | ACCESS TRANSPORT | | | |
| | BACKWARD CALL INDICATOR | | | |
| CALL PROGRESS | EVENT INFORMATION | | | |
| | BACKWARD CALL INDICATOR | | | |
| | ACCESS TRANSPORT | | | |
| | CAUSE INDICATOR | | | |
| | OPTIONAL BACKWARD CALL INDICATOR | | | |
| CIRCUIT RESERVATION | NATURE OF CONNECTION INDICATOR | | | |
| CIRCUIT RESERVATION ACK | N/A | | | |
| CONFUSION | N/A | | | |
| CONTINUITY | CONTINUITY INDICATOR | | | |
| EXIT | OUTGOING TRUNK GROUP NUMBER | | | |
| INFORMATION | ALL PARAMETERS | | | |
| INFORMATION REQUEST | ALL PARAMETERS | | | |
| INITIAL ADDRESS | NATURE OF CONNECTION INDICATOR | | | |
| | FORWARD CALL INDICATOR | | | |
| | CALLING PARTY'S CATEGORY | | | |
| | USER SERVICE INFORMATION | | | |
| | CALLED PARTY NUMBER | | | |
| | ACCESS TRANSPORT | | | |
| | CALLING PARTY NUMBER | | | |
| | CARRIER IDENTIFICATION | | | |
| | CARRIER SELECTION INFORMATION | | | |
| | CHARGE NUMBER | | | |
| | GENERIC ADDRESS | | | |
| | ORIGINATING LINE INFORMATION | | | |
| | ORIGINAL CALLED NUMBER | | | |
| | REDIRECTING NUMBER | | | |
| | SERVICE CODE | | | |
| | TRANSIT NETWORK SELECTION | | | |
| | HOP COUNTER | | | |
| PASS ALONG | ALL PARAMETERS | | | |
| RELEASE | CAUSE INDICATOR | | | |
| | ACCESS TRANSPORT | | | |
| | AUTOMATIC CONGESTION CONTROL | | | |
| RELEASE COMPLETE | N/A | | | |
| RESUME | SUSPEND/RESUME INDICATOR | | | |
| SUSPEND | SUSPEND/RESUME INDICATOR | | | |
| | | | | |

FIG. 19

SYSTEM AND METHOD FOR CONNECTING A CALL

RELATED APPLICATIONS

Not Applicable

FEDERALLY SPONSORED RESEARCH OR DEVELOPMENT

Not Applicable

MICROFICHE APPENDIX

Not Applicable

FIELD OF THE INVENTION

The present invention relates to the field of telecommunications call control and transport.

BACKGROUND OF THE INVENTION

Broadband systems are being developed and implemented. Broadband systems provide telecommunications providers with many benefits, including greater bandwidth, more efficient use of bandwidth, and the ability to integrate voice, data, and video communications. These broadband systems provide callers with increased capabilities at lower costs.

Signaling systems are used to process call signaling and to select connections and processing options for calls. These types of signaling systems are generally comprised of broadband switches or other systems that have the ability to transport asynchronous transfer mode (ATM) formatted communications. These switches and systems have a processor component to process call signaling to select the connections and processing options and a switching or interworking component to connect the connections that are selected by the signaling processor and to interwork and process calls.

Generally, however, each processor component is either attached to, or directly linked to, the switching or interworking component so that the processor component may instruct or control the switching or interworking component. Thus, a more efficient way to control and transport calls over broadband systems using ATM is desirable so that the processor component is not attached to, or directly physically linked to, the switching or interworking component.

SUMMARY OF THE INVENTION

The present invention comprises a system for connecting a call having user communications and call signaling. The system comprises a signaling processor that is adapted to receive the call signaling. The signaling processor processes the call signaling to select a connection. The signaling processor then transports a control message that designates the selected connection. The control message is transported in an asynchronous transfer mode format. The system further comprises an interworking unit that is adapted to receive the user communications in a communication format and to receive the control message from the signaling processor in the asynchronous transfer mode format. The interworking unit interworks the user communications between the communication format and asynchronous transfer mode cells that identify the selected connection. The interworking unit then transports the asynchronous transfer mode cells that contain the user communications over the selected connection. The system further comprises a virtual path that links the signaling processor to the interworking unit. The virtual path is adapted to carry the control message in the asynchronous transfer mode format between the signaling processor and the interworking unit.

Still further, the present invention comprises a system for connecting a call having user communications and call signaling The system comprises a signaling processor that is adapted to receive the call signaling. The signaling processor processes the call signaling to select a connection. The signaling processor then transports a control message that designates the selected connection. The system, further comprises an interworking unit that is adapted to receive the user communications in a communication format and to receive the control message that is transported by the signaling processor. The interworking unit interworks the user communications between the communication format and asynchronous transfer mode cells that identify the selected connection. The interworking unit then transports the asynchronous transfer mode cells that contain the user communications over the selected connection. Still further, the system comprises a cross connect that is adapted to provision a virtual path between the signaling processor and the interworking unit. The virtual path carries the control message between the signaling processor and the interworking unit.

In another aspect, the present invention is a system for connecting a call having user communications and call signaling. The system comprises a first communication device that is adapted to transport the call signaling and the user communications. The system comprises a second communication device that is adapted to receive the user communications. The system also has a signaling processor that is adapted to receive the call signaling and to process the call signaling to select a first connection and a second connection. The signaling processor transports a first control message that designates the selected first connection and a second control message that designates the selected second connection.

The system further comprises a first interworking unit that is adapted to receive the user communications in a first communication format and to receive the first control message that is transported by the signaling processor. The first interworking unit is adapted to interwork the user communications between the communication format and asynchronous transfer mode cells that identify the selected first connection and to transport the asynchronous transfer mode cells that contain the user communications over the selected first connection.

The system includes a second interworking unit that is adapted to receive the asynchronous transfer mode cells that contain the user communications and to receive the second control message that is transported by the signaling processor. The second interworking unit is adapted to interwork the user communications between the asynchronous transfer mode cells and the second communication format and to transport the user communications in the second communication format to the second communication device over the selected second connection.

The system also includes a cross connect that is adapted to provision a first virtual path between the signaling processor and the first interworking unit to carry the first control message from the signaling processor to the first interworking unit. The cross connect also is adapted to provision a second virtual path between the signaling processor and the second interworking unit to carry the second control message from the signaling processor to the second interworking unit.

In still another aspect, the present invention is a method for connecting a call having call signaling and user communications. The method comprises provisioning a virtual path to an interworking unit. The method includes receiving the call signaling in a signaling processor and processing the call signaling to determine a connection for the user communications. A control message is transported over the virtual path from the signaling processor to the interworking unit. The control message designates the selected connection. The control message is received in the interworking unit over the virtual path, and the user communications are received in the interworking unit. The user communications are interworked to asynchronous transfer mode cells that identify the selected connection. The asynchronous transfer mode cells then are transported from the interworking unit over the selected connection.

In yet another aspect, the present invention comprises a method for connecting a call having call signaling and user communications. The method comprises provisioning a virtual path to carry a control message. The call signaling is received and processes to determine a connection for the user communications. The control message is transported over the virtual path. The control message designates the selected connection. The control message is received over the virtual path. The user communications are interworked to asynchronous transfer mode cells that identify the selected connection that was designated in the control message. The asynchronous transfer mode cells are transported over the selected connection.

BRIEF DESCRIPTION OF THE DRAWINGS

FIG. 7 is a functional diagram of an asynchronous transfer mode interworking unit for use with a synchronous digital hierarchy system in accordance with the present invention.

FIG. 8 is a block diagram of a signaling processor constructed in accordance with the present system.

FIG. 12 is a table diagram of a trunk group table used in the signaling processor of FIG. 9.

FIG. 13 is a table diagram of an exception circuit table used in the signaling processor of FIG. 9.

FIG. 14 is a table diagram of an automated number index table used in the signaling processor of FIG. 9.

FIG. 15 is a table diagram of a called number table used in the signaling processor of FIG. 9.

FIG. 16 is a table diagram of a routing table used in the signaling processor of FIG. 9.

FIG. 17 is a table diagram of a treatment table used in the signaling processor of FIG. 9.

FIG. 18 is a table diagram of a message table used in the signaling processor of FIG. 9.

FIG. 19 is a table diagram of a routing table used in the signaling processes of FIG. 9.

DETAILED DESCRIPTION

Figure 1:
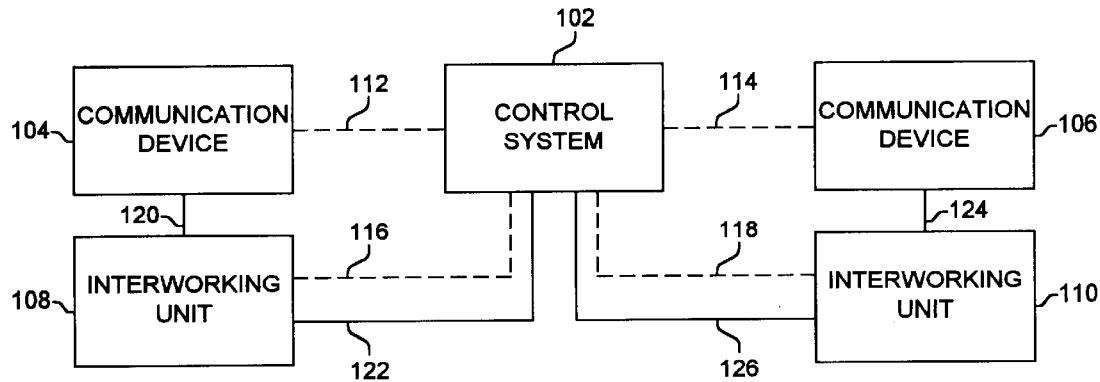
FIG. 1 is a block diagram of a control system that remotely controls an interworking unit.

Telecommunication systems have a number of communication devices in local exchange and interexchange environments that interact to provide call services, to customers. Both traditional services and resources and intelligent network (IN) services and resources are used to process, route, or connect a call to a designated connection.

A call has call signaling and user communications. The user communications contain the caller's information, such as a voice communication or data communication, and they are communicated over a connection. Call signaling contains information that facilitates call processing, and it is communicated over a link. Call signaling, for example, contains information describing the called number and the calling number. Examples of call signaling are standardized signaling, such as signaling system #7 (SS7), C7, integrated services digital network (ISDN), and digital private network signaling system (DPNSS), which are based on ITU recommendation Q.933.

A call can be transported to or from a communication device. A communication device can be, for example, customer premises equipment (CPE), a service platform, a switch, or any other device capable of initiating, handling, or terminating a call. Customer premises equipment can be, for example, a telephone, a computer, a facsimile machine, or a private branch exchange. A service platform can be, for example, a service platform or any other enhanced platform that is capable of processing calls.

Communications devices in both traditional and intelligent systems can use a variety of protocols and methods to achieve a connection for a call or to complete call processing. For example, CPE can be connected to a switch using a time division multiplex (TDM) format, such as super frame (SF) or extended superframe (ESF). The ESF connection allows multiple devices at the customer site to access the local switch and obtain telecommunication services.

Also, communication devices, such as telephones, are likely connected to a remote digital terminal, and the connection typically carries analog signals over twisted pair wires. The remote digital terminals provide a digital interface between the telephones and a local switch by converting the analog signals from the telephones into a multiplexed digital signal to be transferred to the local switch. A common standard for the connection between the remote digital terminal and the local switch is provided in Bellcore Reference GR-TSY-000303 (GR-303).

In addition, communications devices use broadband protocols, such as broadband-integrated services digital network (B-ISDN). Broadband systems provide greater bandwidth than narrowband systems for calls, in addition to providing digital processing of the calls. B-ISDN provides a communication device with a digital connection to a local switch or other device. The B-ISDN loop provides more bandwidth and control than a convention local loop. The European implementation of B-ISDN and other broadband protocols can also be used.

Communication devices use circuit-based connections for calls. For example, digital signal (DS) level communications, such as digital signal level 3 (DS3), digital signal level one (DS1), and digital signal level zero (DS0) are conventional circuit-based connections. European level four (E4), European level three (E3), European level one (E1), European level zero (E0), and other European equivalent circuit-based connections, also are used.

High speed electrical/optical transmission protocols also are used by communications devices for switching and signaling. The synchronous optical network (SONET) protocol, which is used primarily in North America, and the synchronous digital hierarchy, (SDH) protocol, which is used primarily in Europe, are examples of high speed electrical/optical protocols. The SONET and SDH protocols describe the physical media and transmission protocols through which the communications take place.

SONET includes optical transmission of optical carrier (OC) signals and electrical transmission of synchronous, transport signals (STSs). SONET signals transmit at a base rate of 51.84 Mega-bits per second (Mbps) for optical carrier level one (OC-1) and synchronous transport signal level one (STS-1). Also transmitted are multiples thereof, such as an STS level three (STS-3) and an OC level three (OC-3) at rates of 155.52 Mbps and an STS level twelve (STS-12) and an OC level 12 (OC-12) at rates of 622.08 Mbps, and fractions thereof, such as a virtual tributary group (VTG) at a rate of 6.912 Mbps.

SDH includes transmission of optical synchronous transport module (STM O) signals and electrical synchronous transport module (STM E) signals. SDH signals transmit at a base rate of 155.52 Mbps for synchronous transport module level one electrical and optical (STM-1 E/O). Also transmitted are multiples thereof, such as an STM level four electrical/optical (STM-4 E/O) at rates of 622.08 Mbps, and fractions thereof, such as a tributary unit group (TUG) at a rate of 6.912 Mbps.

Asynchronous transfer mode (ATM) is one technology that is being used in conjunction with SONET and SDH to provide broadband call switching and call transport for telecommunication services. ATM is a protocol that describes communication of user communications in ATM cells. Because the protocol uses cells, calls can be transported on demand for connection-oriented traffic or connectionless-oriented traffic, constant-bit traffic or variable-bit traffic, and between equipment that either requires timing or does not require timing.

Some ATM systems handle calls over switched virtual paths (SVPs) and switched virtual circuits (SVCs). The virtual nature of ATM allows multiple communication devices to use a physical communication line at different times. This type of virtual connection more efficiently uses bandwidth, and thereby provides more cost efficient transport for customer calls, than permanent virtual circuits (PVCs) or other dedicated circuits.

The ATM system is able to connect a caller from an origination point to a destination point by selecting a connection from the origination point to the destination point. The connection contains a virtual path (VP) and a virtual channel (VC). A VC is a logical connection between two end points for the transfer of ATM cells. A VP is a logical combination of VCs. The ATM system designates the selected connection by specifying a virtual path identifier (VPI) that identifies the selected VP and a virtual channel identifier (VCI) that identifies the selected VC within the selected VP. Because many ATM connections are uni-directional, bi-directional communications in an ATM system usually require companion VPIs/VCIs.

The control system of the present invention provides a more efficient way to link interworking units with a signaling processor by providing control messages to interworking units remotely. This allows one signaling processor to communicate control messages to multiple interworking units without having a separate and physical direct link to each interworking unit.

The control system can remotely control a plurality of interworking units. Preferably, this is accomplished by provisioning a VPI/VCI from each interworking unit or communication device to a signaling processor.

FIG. 1 illustrates a control system 102 that remotely transports control messages to system devices. The control system 102 is connected to a first communication device 104 and a second communication de vice 106. The control system also is connected to a first interworking unit 108 and a second interworking unit. 110.

The control system 102 is linked to the first communication device 104 through a link 112, to the second communication device 106 through a link 114, to the first interworking unit 108 through a link 116, and to the second interworking unit 110 through a link 108. The first interworking unit 108 is connected to the first communication device 104 through a, connection 120 and to the control system 102 through a connection 122. The second interworking unit 110 is connected to the second communication device 106 through a connection 124 and to the control system 102 through a connection 126.

Connections are used to transport user communications and other device information between communication devices and between the elements and devices of the processing system 102. The term "connection" as used herein means the transmission media used to carry user communications between the first and second communication devices 104 and 106 and the processing system 102 or between the elements of the processing system 102. For example, a connection could carry a user's voice, computer data, or other communication device data. A connection can be associated with either in-band communications or out-of-band communications.

Links are used to transport call signaling and control messages. The term "link" as used herein means a transmission media used to carry call signaling and control messages. For example, a link would carry call signaling or a device control message containing device instructions and data. A link can carry, for example, out-of-band signaling such as SS7, C7, ISDN, B-ISDN, GR-303, local area network (LAN), or data bus call signaling. A link can be, for example, an AAL5 data link, UDP/IP, ethernet, or DS0 over T1. In addition, a link, as shown in the figures, can represent a single physical link or multiple links, such as one link or a combination of links of ISDN, SS7, TCP/IP, or some other data link. The term "control message" as used herein means a control or signaling message, a control or signaling instruction, or a control or signaling signal, whether proprietary or standardized, that conveys information from one point to another.

The control system 102 remotely controls one or more interworking units 108 and 110. The control system 102 processes call signaling; from the communication devices 104 and 106 to determine connections and processing options for calls. The control system 102 directs the interworking units 108 and 110 to make connections for calls and, in some instances, assists in routing user communications for calls.

The communication devices 104 and 106 each comprise CPE, a service platform, a switch, a remote digital terminal, or any other device capable of initiating, handling, or terminating a call. CPE can be, for example, a telephone, a computer, a facsimile machine, or a private branch exchange. A service platform can be, for example, a service platform or any other enhanced platform that is capable of processing calls. A remote digital terminal is a device that concentrates analog twisted pairs from telephones and other like devices and converts the analog signals to a digital format known as GR-303.

The first interworking unit 108 interworks traffic between various protocols. Preferably, the first interworking unit 108 interworks between ATM traffic and non-ATM traffic. The first interworking unit 108 operates in accordance with control messages received from the control system 102 over the link 116. These control messages are typically provided on a call-by-call basis and typically identify an assignment between a DS0 and a VPI/VCI for which user communications are interworked. In some instances, the first interworking unit 108 may transport control messages which may include data to the control system 102.

The second interworking unit 110 interworks traffic between various protocols. Preferably, the second interworking unit 110 interworks between ATM traffic and non-ATM traffic. The second interworking unit 110 operates in accordance with control messages received from the control system 102 over the link 118. These control messages are typically provided on a call-by-call basis and typically identify an assignment between a DS0 and a VPI/VCI for which user communications are interworked. In some instances, the second interworking unit 110 may transport control messages which may include data to the control system 102.

The control system 102 of FIG. 1 operates as follows when the first communication device 104 transports a call to the second communication device 106. The first communication device 104 transports call signaling to the control system 102. Typically the call signaling is SS7 call signaling. The first communication device 104 also transports user communications to the first interworking unit 108. Typically, the user communications are TDM formatted user communications, such as a DS0.

The control system 102 processes the call signaling to select a first connection 122 and a second connection 124. The selected first connection 122 is a VPI/VCI and the selected second connection 124 is a DS0. The control system 102 sends a control message to the first interworking unit 108 identifying the selected first connection 122 for the user communications. The control system 102 also sends a control message to the second interworking unit 110 identifying the selected second connection 124. In addition, the control system 102 provisions a virtual path between the first interworking unit 108 and the second interworking unit 110 over the connection 122 and the connection 126.

The first interworking unit 108 receives the user communications from the first communication device 104 and the control message from the control system 102. The first interworking unit 108 interworks the user communications between the TDM format and the ATM format. Therefore, the first interworking unit 108 converts the user communications into ATM cells that identify the selected first connection 122. The first interworking unit 108 then transports the ATM cells over the selected first connection 122.

The control system 102 receives the ATM cells and routes them over the provisioned VPI(VCI connection 126 of the provisioned virtual path to the second interworking unit 110. The second interworking unit 110 receives the ATM cells containing the user communications from the control system 102 over the connection 126. In addition, the second interworking unit 110 receives the control message from the control system 102 that identifies the selected second connection 124.

The second interworking unit 110 interworks the ATM cells from the VPI/VCI connection 126 to the selected second connection 124 identified in the control message from the control system 102. The second interworking unit 110 converts the ATM cells to user communications having a TDM, format for the DS0. The second interworking unit 110 then transports the user communications over the selected second connection 124 to the second communication device 106.

A call also may be transported from the second communication 106 device to the first communication device 104 in the manner described above. However, after receiving and processing the call signaling from the second communication device 106, the signaling processor 202 transports a first control message that identifies a selected first connection 126 to the second interworking unit 110 over the link 118. In addition, the signaling processor 202 transports a second control message that identifies a selected second connection 120 to the first interworking unit 108 over the link 116.

The second interworking unit 110 receives the user communications from the second communication device 106 and interworks the user communications from a communication format, such as TDM, to the ATM format. The second interworking unit 110 then transports the ATM cells over the selected first connection. The control system 102 receives the ATM cells and routes them over the connection 122 to the first interworking unit 108. The first interworking unit 102 receives the ATM cells and interworked them from the ATM format to user communications with a communication format, such as TDM. The first interworking unit 108 then transports the user communications to the first communication device 104.

Figure 2:
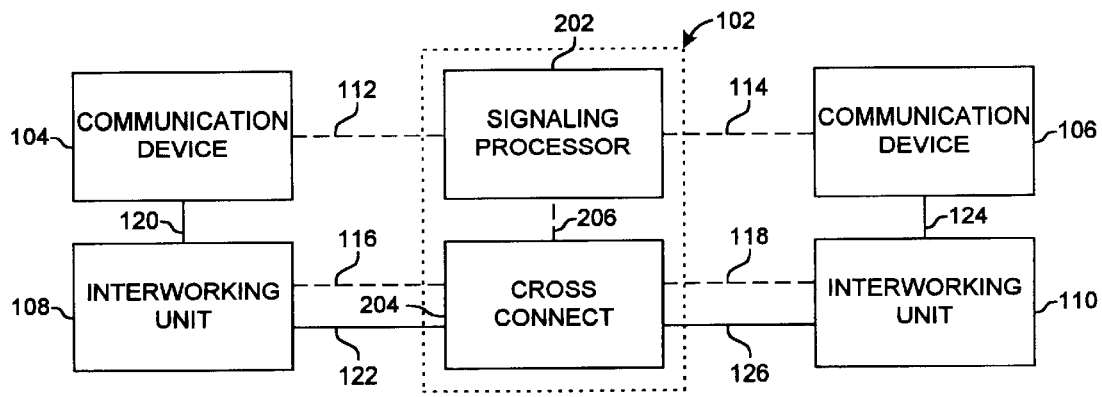
FIG. 2 is a block diagram of a version of the control system of FIG. 1.

FIG. 2 illustrates an expanded control system 102. The control system 102 comprises a signaling processor 202 and a cross connect 204 with a link 206 between the signaling processor and the cross connect. The signaling processor 202 is linked to the first communication device 104 through the link 112 and to the second communication device 106 through the link 114. The cross connect 204 is connected to the first interworking unit 108 through the connection 122 and to the second interworking unit 110 through the connection 126. The cross connect 204 is linked to the first interworking unit 108 through the link 116 and to the second interworking unit 110 through the link 118.

It will be appreciated that the cross connect 204 may be connected to other communication devices in addition to, or in place of, the first and second interworking units 108 and 110. In such a configuration, the cross connect 204 will provision VPIs/VCIs to the other communication devices for connections to carry user communications or for links to carry call signaling and control messages.

The signaling processor 202 is a signaling platform that can receive and process signaling. Based on the processed signaling, the signaling processor 202 selects processing options for the user communications and generates and transmits control messages that identify the communication device, processing option, service, or resource that is to be used. The signaling processor 202 also selects virtual connections and circuit-based connections for call routing and generates and transports control messages that identify the selected connections. The signaling processor 202 can process various forms of signaling, including ISDN, SS7, and C7. A preferred signaling processor is discussed below.

The cross connect 204 is any device, such as an ATM cross connect, that provides a plurality of ATM virtual connections between the first interworking unit 108 and the second interworking unit 110, between the first and second interworking units 108 and 110 and other communication devices (not shown), or between other communication, devices. The cross connect 204 also provides a link 406 that has virtual connections to the signaling processor 202. In ATM, virtual connections and, in the present case, links can be designated by the VPI/VCI in the cell header. An example of an ATM cross connect is the NEC Model 20.

The cross connect 204 is configured to provide a provisioned virtual path having VPI/VCI links 116 and 118 for signaling. The VPI/VCI links are provisioned from the signaling processor 202 to one or more interworking units, such as, for example the first and second interworking units 108 and 110. The VPI/VCI links carry control messages from the signaling processor 202 to the first and second interworking 108 and 110 units so that the interworking units are remotely controlled and direct links do not have to be linked between the signaling processor and each interworking unit.

Because VPI/VCI links are used, an interworking unit may be added to the ATM system without adding a new direct connection between the signaling processor 202 and the new interworking unit. Instead, a new VPI/VCI is provisioned to link the signaling processor 202 to the new interworking unit. This provides flexibility so that a signaling processor and an interworking unit may be placed anywhere in the ATM system.

Figure 3:
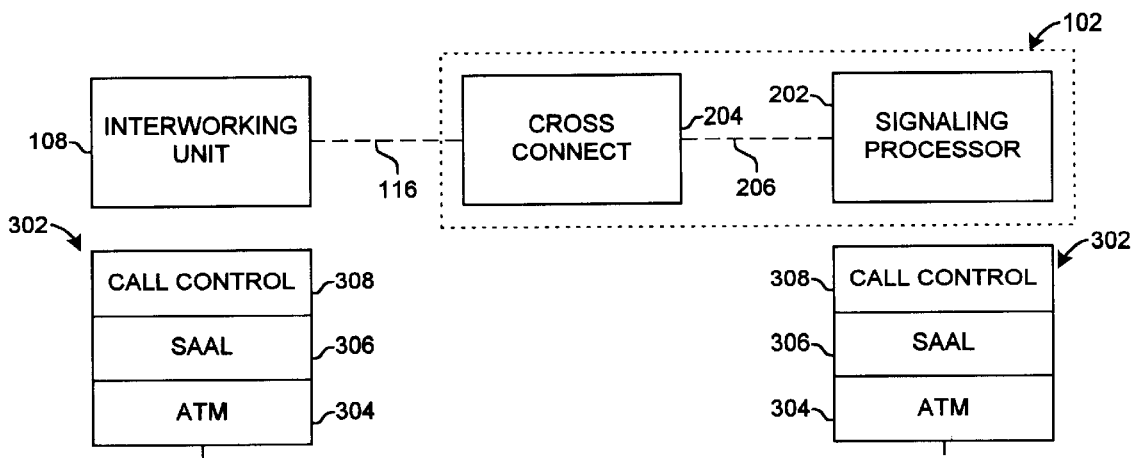
FIG. 3 is a relational diagram of a protocol stack used to provide assured delivery of control messages between a signaling 'processor' and an interworking unit.

FIG. 3 illustrates a protocol stack 302 that is used to govern call transport so that signaling is reliably transported between the signaling processor 202 and the first interworking unit 108 with minimal errors. Although the second interworking unit 110 is not shown, the protocol stack 302 also is used to govern call transport for reliable signaling between the signaling processor 202 and the second interworking unit of FIG. 2. Thus, the description of FIG. 3 is applicable to signaling between the signaling processor 202 and the second interworking unit 110.

The protocol stack 302 has an ATM layer 304, a signaling ATM adaptation layer (SAAL) 306, and a call control layer 308. The protocol stack 302 is used for point-to-point and point-to-multipoint peer-to-peer call control. Software to support the protocol stack 302 is known in the art and may be acquired, for example, from the Trillium Company.

The ATM layer 304 supports call signaling and user communications for multiplex and demultiplex functions, VPI/VCI translation, ATM cell header generation and extraction, and flow control. In the transport direction, the ATM layer multiplexes cells from VPs and VCs into a composite cell flow. In the receive direction, the ATM layer 308 demultiplexes a composite cell flow to direct cells to the appropriate VP and VC VPI/VCI fields in an incoming cell may require mapping to a new VPI/VCI. The ATM layer 308 also generates an ATM header and attaches it to a payload in the transport direction or extracts the payload from a received call and passes the payload to the next layer in the receive direction. In addition, the ATM layer 308 may generate cells to carry generic flow control information.

The SAAL 306 protocol and procedures define how to transport control messages reliably within the cells of the ATM layer 304 on VCs used for call signaling. The SAAL 306 is used as the delivery mechanism for the remote call signaling between the signaling processor 202 and one or more interworking units.

Referring still to FIG. 3, the SAAL 306 includes a common part and a service specific part. The common part identifies functions common to all users that require a connection-oriented, variable-bit rate transport. The common part provides information transfer, segmentation and reassembly, and information corruption detection in the SAAL frames. The service specific part identifies the protocol and procedures required at the user-network interface (UNI). In addition, the service specific part provides for recovery of lost, misinserted, or corrupted SAAL frames.

The service specific part includes a device-specific connection-oriented. protocol sublayer (SSCOP) and a service-specific coordination function sublayer (SSCF). The SSCOP is used for flow control and error correction. The SSCOP transfers service data units (SDUs) between SSCOP users and provides for the recovery of SDUs. The SSCF maps the service of SSCOP to the needs of the SSCF user. The common part is defined by ITU-T I.363, the SSCF by ITU-T Q.2130, and the SSCOP by ITU-T Q.2110, each of which is incorporated herein by reference.

The call control layer 308 is used to dynamically establish, maintain, and clear virtual connections between ATM interfaces. The call control layer 308 controls aspects such as call routing, determination of resource availability, subscription parameter procedures, and calling party addressing delivery.

Communication with a remote peer, such as between the first interworking unit 108 and the signaling processor 202, at the same layer involves exchanging primitives. A primitive represents a logical exchange of information between a layer and the adjacent layers. Thus, for example, a primitive may be generated by the SAAL 306 and passed to the call control layer 308.

Referring back to FIG. 2, the control system 102 is configured so that the cross connect 204 provisions a first virtual path between the signaling processor 202 and the first interworking unit 108. The first virtual path is provisioned from the link 116 that is between the first interworking unit 108 and the cross connect 204, and the first path extends through a VPI/VCI in the link 206 that is between the signaling processor 202 and the cross connect. The signaling processor 202 transports a first control message in ATM cells to the cross connect 204 over a VPI/VCI in the link 206. The control message is routed in the ATM cells by the cross connect 204 over the link 116 in the provisioned first path. Thus, the first control message is transported from the signaling processor 202 to the first interworking unit 108 over the provisioned first path.

The control system 102 is configured so that the cross connect 204 provisions a second virtual path between the signaling processor 202 and the second interworking unit 110. The second virtual path is provisioned from the link 118 that is between the second interworking unit 110 and the cross connect 204, and the second path extends through a VPI/VCI in the link 206 that is between the signaling processor 202 and the cross connect. The signaling processor 202 transports a second control message in, ATM cells to the cross connect 204 over a VPI/VCI in the link 206. The control message is routed in the ATM cells by the cross connect 204 over the link 118 in the provisioned second path. Thus, the second control message is transported from the signaling processor 202 to the second interworking unit 110 over the provisioned second path.

Referring still to FIG. 2, the control system 102 operates as follows. A first path is provisioned from the signaling processor 202 through the cross connect. 204 and to the first interworking unit 108. The first path connects the VPI/VCI link 116 with VPI/VCI in the link 206 leading to the signaling processor 202. A second path is provisioned from the signaling processor 202 through the cross connect 204 and to the second interworking unit 110. The second path connects the VPI/VCI link. 118 with another VPI/VCI in the link 206 leading to the signaling processor 202. Paths are also provisioned for transport for user communications over the connections 122 and 126 from the cross connect 204 to the first and second interworking units 108 and 110, respectively.

The first communication device 104 transports a call. The first communication device 104 transports the call signaling to the signaling processor 202 over the link 112 and the user communications to the first interworking unit 108 over the connection 120.

The signaling processor 202 receives the call signaling and processes the call signaling to select a processing option for the call, such as a first connection 122 and a second connection 124. In addition, the signaling processor 202 may select other processing options, such as echo cancellation to be performed by the first interworking unit 108, or service processing to be performed by a service platform (not shown).

The signaling processor 202 transports a first control message to the first interworking unit 108 identifying the selected first connection 122. The first control message is transported from the signaling processor 202 to the first interworking unit 108 over the provisioned first path, including the link 206 and the connected link 116. The signaling processor 202 transports a second control message to the second interworking unit 110 identifying the selected second connection 124. The second control message is transported over the provisioned second path, including the link 206 and the connected link 118. The control system 102 uses the SAAL 306 to assure delivery of the first and second control messages. (See FIG. 3.)

The first interworking unit 108 receives the user communications from the first communication device 104 and the first control message from the signaling processor 202. The first interworking unit 108 interworks the user communications from the communication format in which they are received to ATM cells that identify the selected first connection 122 over which they will be transported. The first interworking unit 108 then transports the ATM cells over the selected first connection 122 to the cross connect 204.

At the cross connect 204, a path is provisioned that connects the connection 122 from the first interworking unit 108 to the connection 126 leading to the second interworking unit 110. Thus, the cross connect 204 receives the ATM cells and routes them over the connection 126 to the second interworking unit 110.

The second interworking unit 110 receives the ATM cells over the provisioned connection 126 and the second control message over the provisioned link 118 of the provisioned second path. The second interworking unit 110 uses the second control message to identify the selected second connection 124. The second interworking unit 110 interworks the user communications between the ATM cells and user communications with a communication format that is compatible with the second communication device 106. Typically, the ATM cells are converted to TDM formatted user communications. The second interworking unit 110 then transports the user communication to the second communication device 106 over the selected second connection 124.

Referring still to FIG. 2, the control system. 102 also may operate to connect a call from the second communication device 106 to the first communication device 104. The control system 102 operates in the reverse of that described above.

The second communication device 106 transports a call. The second communication device 106 transports the call signaling to the signaling processor 202 over the link 114 and the user communications to the second interworking unit 110 over the connection 124.

The signaling processor 202 receives the call signaling and processes the call signaling to select a processing option for the call, such as a first connection 126 and a second connection 120. In addition, the signaling processor 202 may select other processing options, such as echo cancellation to be performed by the second interworking unit 110, or service processing to be performed by a service platform (not shown).

The signaling processor 202 transports a first control message to the second interworking unit 110 identifying the selected first connection 126. The first control message is transported from the signaling processor 202 to the second interworking unit 110 over the provisioned second path, including a VPI/VCI in the link 206 and the connected link 118. The signaling processor 202 transports a second control message to the first interworking unit 108 identifying the selected second connection 120. The second control message is transported over the provisioned first path, including a VPI/VCI in the link 206 and the connected link 116. The control system 102 uses the SAAL 306 to assure delivery of the first and second control messages. (See FIG. 3.)

The second interworking unit 110 receives the user communications from the second communication device 106 and the first control message from the signaling processor 202. The second interworking unit 110 interworks the user communications from the communication format in which they are received to ATM cells that identify the selected first connection 126 over which they will be transported. The second interworking unit 110 then transports the ATM cells over the selected- first connection 126 to the cross connect 204.

At the cross connect 204, a path is provisioned that connects the connection 126 from the second interworking unit 110 to the connection 122 leading to the first interworking unit 108. Thus, the cross connect 204 receives the ATM cells and routes them over the provisioned connection 122 to the first interworking unit 108.

The first interworking unit 108 receives the ATM cells over the connection 122 and the second control message over the link 116 of the provisioned first path. The first interworking unit 108 uses the second control message to identify the first selected connection 120. The first interworking unit 108 interworks the user communications between the ATM cells and user communications with a communication format that is compatible with the first communication device 104. Typically, the ATM cells are converted to TDM formatted user communications. The first interworking unit 108 then transports the user communications to the first communication device 104 over the selected second connection 120.

Figure 4:
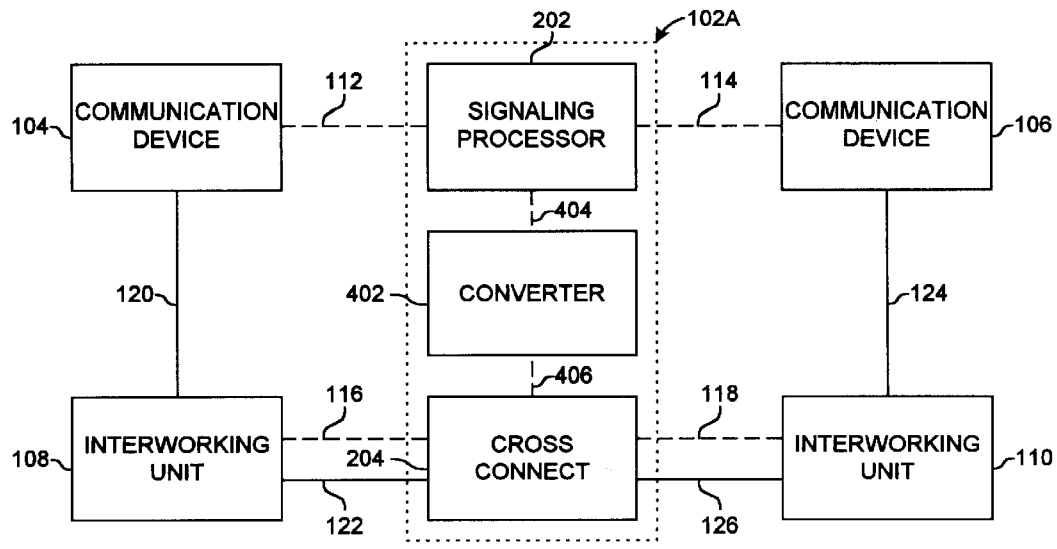
FIG. 4 is a block diagram of a version of the control system of FIG. 1 which includes a converter.

As illustrated in FIG. 4, the control system 102A may be configured so that the signaling processor 202 transports control messages in an internet protocol (IP) format. The control system 102A of that configuration has a converter 402 that is linked to the signaling processor 202 through a link 404 and to the cross connect 204 through a link 406. The link 404 to the signaling processor 202 may be, for example, an ethernet link. The link 406 to the cross connect 204 has one or more VPIs/VCIs.

The converter 402 converts control messages between the IP format and the ATM format. For example, a first path may be provisioned with a VPI/VCI in the link 406. A second path may be provisioned with another VPI/VCI in the link 406. The converter 402 encapsulates an IP formatted control message that is received from the link 404 and transports the control message over a VPI/VCI in the link 406 to the cross connect 204 in ATM cells that identify the VPI/VCI. In addition, the converter 402 converts ATM cells that contain control messages and that are received over the link. 406 from the cross connect 204 to IP formatted control messages and transports the control messages to the signaling processor 202.

The control system 112A of FIG. 4 operates as follows. Either the first communication device 104 or the second communication device 106 transports a call. The call signaling is transported to the signaling processor 202 and the user communications to the respective first interworking unit 108 or second interworking unit. 110.

The signaling processor 202 receives the call signaling and processes the call signaling to select a processing options for the call, such as one or more connections. In addition, the signaling processor 202 may select other processing options, such as echo cancellation to be performed by the first or second interworking units 108 or 110, or service processing to be performed by a service platform (not shown).

The signaling processor 202 transports a first control message to the first interworking unit 108 identifying a selected connection. The first control message is transported from the signaling processor 202 to converter 402 in the IP format. The converter 402 converts the first control message to ATM cells and transports the ATM cells to the cross connect 406 over a VPI/VCI in the link 406. Because the path has been provisioned from the converter 402 to the first interworking unit 108 through the VPI/VCI in the link 406 and through the link 116, the cross connect 204 routes the first control message to the first interworking unit 108 over the link 116.

The signaling processor 202 also transports a second control message to the second interworking unit 110 identifying a selected connection. The second control message is transported from the signaling processor 202 to the converter 402 in the IP format. The converter 402 converts the second control message to ATM cells and transports the ATM cells to the cross connect 406 over another VPI/VCI in the link 406. Because the path from the converter 402 to the second interworking unit 110 has been provisioned through the VPI/VCI in the link 406 and through the link 118, the cross connect 204 routes the second control message to the second interworking unit 110 over the link 118.

The connections for user communications are connected as discussed above for either calls that are transported from the first communication device 104 to the second communication device 110 or calls that are transported from the second communication device to the first communication device. In addition, interworking by the first interworking unit 108 and the second interworking unit 110 proceeds as described above.

Figure 5:
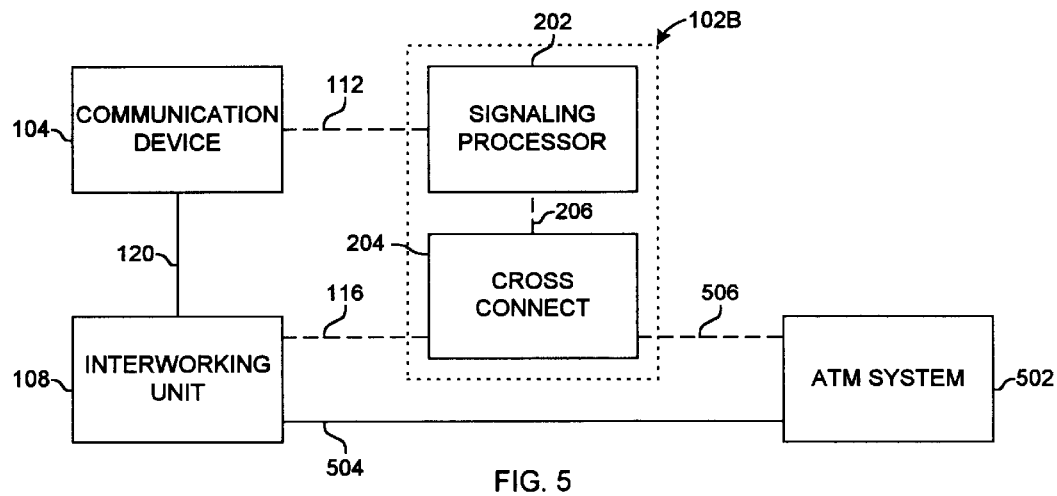
FIG. 5 is a block diagram a version of a control system in which user communications are transported outside of the control system.

It will be appreciated that the control system may have other configurations. For example, as illustrated in FIG. 5, call signaling or control messages may be routed through the cross connect 204 over a provisioned path from the signaling processor 202 to the first interworking unit 108 over a VPI/VCI in the link 206 and the link 116. In addition, call signaling or control messages may be routed through the cross connect 204 over a provisioned path from the signaling processor 202 to an ATM system 502 over a VPI/VCI in the link 206 and the link 506. However, user communications may be transported directly between the first interworking unit 108 and the ATM system 502, or a communication device, over a connection 504, without being routed by the cross connect 204.

Figure 6:
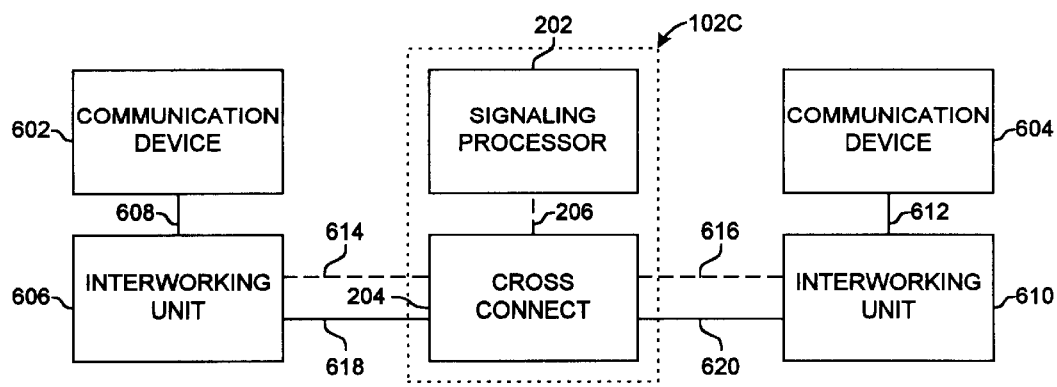
FIG. 6 is a functional diagram of an asynchronous transfer mode interworking unit for use with a synchronous optical network system in accordance with the present invention.

As illustrated in FIG. 6, call signaling may be transmitted in-band. The control system 102C of FIG. 6 includes the signaling processor 202 and the cross connect 204 that are described above. Also included is the link 206 that links the signaling processor 202 to the cross connect 204.

However, the control system 102C interacts with a system which includes a first communication device 602 and a second communication device 604 that transport call signaling in-band, such as in the ESF format. The first communication device 602 transmits user communications and call signaling in-band to the first interworking unit 606 via a connection 608. The second communication device 604 transmits user communications and call signaling in-band to the second interworking unit 610 via a connection 612.

The cross connect 204 is linked to the first interworking unit 606 through a link 614 and to the second interworking unit 610 through a link 616. The cross connect 204 is connected to the first interworking unit 606 through a connection 618 and to the second interworking unit 610 through a connection 610.

The first and second communication devices 602 and 604 are the same as the first and second communication devices 104 and 106 of FIG. 2, respectively, except that the first and second communication devices 602 and 604 of FIG. 6 only transport call signaling in-band. The first and second interworking units 606 and 610 of FIG. 5 are the same as the first and second interworking units 108 and 110 of FIG. 2, respectively.

However, in the control system 102C of FIG. 6, a virtual path is provisioned by the cross connect 204 from each of the first and second interworking units 606 and 610 to the signaling processor 202. These virtual paths are used by the first and second interworking units 606 and 610 to transport the call signaling to the signaling processor 202.

Therefore, companion VPIs/VCIs are connected for the link 614 from the first interworking unit 606 to the cross connect 204 and for the link 206 from the cross connect to the signaling processor 202. This provides a bi-directional virtual path for call signaling and control messages to be transported between the signaling processor 202 and the first interworking unit 606.

Likewise, companion VPIs/VCIs are connected for the link 616 from the second interworking unit 610 to the cross connect 204 and for the link 206 from the cross connect to the signaling processor 202. This provides a bi-directional virtual path for call signaling and control messages to be transported between the signaling processor 202 and the second interworking unit 610.

The system of FIG. 6 operates as follows. The cross connect 204 provisions a first virtual path from the signaling processor 202 to the first interworking unit 606. The first virtual path is bi-directional and connects companion VPIs/VCIs for the link 616 to a first set of companion VPIs/VCIs in the link 206.

The cross connect 204 provisions a second virtual path from the signaling processor 202 to the second interworking unit 610. The second virtual path is bi-directional and connects companion VPIs/VCIs for the link 618 to a second set of companion VPIs/VCIs in the link 206.

The first communication device 602 transports user communications and call signaling in-band to the first interworking unit 606. The first interworking unit 606 may detect the in-band call signaling and convert the in-band call signaling to call signaling that may be transported to the signaling processor 202 separate from the user communications. The first interworking unit 606 then transports the call signaling to the signaling processor 202 via the cross connect 204 over the first virtual path.

The signaling processor 202 processes the call signaling to determine a first connection 618 and a second connection 612 for the call. The signaling processor 202 transports a first control message via the first virtual path to the first interworking unit 606. The first control message designates the first connection 618. The signaling processor 202 also transports a second control message via the second virtual path to the second interworking unit 610. The second control message designates the second connection 620.

The first interworking unit 606 receives the first control message over the first virtual path and receives the user communications from the first communication device 602. The first interworking unit 606 interworks the user communications to ATM cells that identify the selected first connection 618. The first interworking unit 606 then transports the ATM cells over the selected first connection 618. The cross connect 204 receives the ATM cells and routes them to the second interworking unit 610 via the connection 620 which had been provisioned for the selected first connection 618.

The second interworking unit 610 receives the ATM cells from the connection 618 and the second control message over the second virtual path. The second interworking unit 610 interworks the ATM cells to user communications in a communication format, such as a PCM format, that is processable by the second communication device 604. The second interworking unit 610 then transports the user communications, together with any required call signaling in-band, to the second communication device 604.

The system of FIG. 6 also transports a call from the second communication device 604 to the first communication device 602 in a like manner. It will be appreciated that other configurations also may exist.

The ATM Interworking Unit

Figure 9:
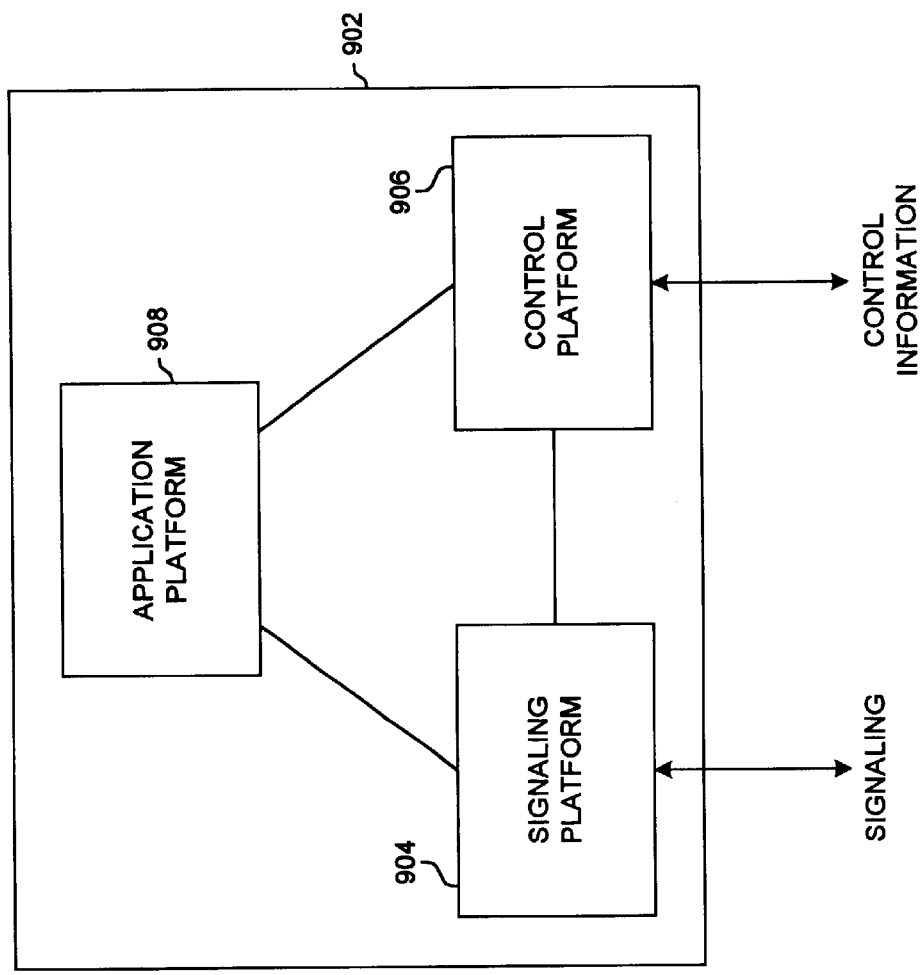
FIG. 9 is a block diagram of a data structure having tables that are used in the signaling processor of FIG. 8.

FIG. 9 shows one embodiment of an interworking unit which is an ATM interworking unit 902 suitable for the present invention for use with a SONET system, but other interworking units that support the requirements of the invention are also applicable. The ATM interworking unit 902 may receive and transmit in-band and out-of-band calls.

The ATM interworking unit 902 has a control interface 904, an OC-N/STS-N interface 906, a DS3 interface 908, a DS1 interface 910, a DS0 interface 912, a signal processor 914, an ATM adaptation layer (AAL) 916, an OC-M/STS-M interface 918, and an ISDN/GR-303 interface 920. As used herein in conjunction with OC or STS, "N" refers to an integer, and "M" refers to an integer.

The control interface 902 accepts control messages from the signaling processor 922. In particular, the control interface 904 identifies DS0 connections and virtual connection assignments in the control messages from the signaling processor 922. These assignments are provided to the AAL 916 for implementation.

The OC-N/STS-N interface 906, the DS3 interface 908, the DS1 interface 910, the DS0 interface 912, and the ISDN/GR-303 interface 920 each can accept calls, including user communications, from a communication device 924. Likewise, the OC-M/STS-M interface 918 can accept calls, including user communications, from a communication device 926.

The OC-N/STS-N interface 906 accepts OC-N formatted calls and STS-N formatted calls and converts the calls from the OC-N or STS-N formats to the DS3 format. The DS3 interface 908 accepts calls in the DS3 format and converts the calls to the DS1 format. The DS3 interface 908 can accept DS3s from the OC-N/STS-N interface 906 or from an external connection. The DS1 interface 910 accepts the calls in the DS1 format and converts the calls to the DS0 format. The DS1 interface 910 can accept DS1s from the DS3 interface 908 or from an external connection. The DS0 interface 912 accepts calls in the DS0 format and provides an interface to the AAL 916. The ISDN/GR-303 interface 920 accepts calls in either the ISDN format or the GR-303 format and converts the calls to the DS0 format. In addition, each interface may transmit signals in like manner to the communication device 924.

The OC-M/STS-M interface 918 is operational to accept ATM cells from the AAL 916 and to transmit the ATM cells over the connection to the communication device 926. The OC-M/STS-M interface 918 may also accept ATM cells in the OC or STS format and transmit them to the AAL 916.

The AAL 916 comprises both a convergence sublayer and a segmentation and reassembly (SAR) sublayer. The AAL 916 is operational to accept communication device information in the DS0 format from the DS0 interface 912 and to convert the communication device information into ATM cells. AALs are known in the art and information about AALs is provided by International Telecommunications. Union (ITU): document I.363, which is incorporated fully herein by reference. An AAL for voice calls is described in U.S. patent application Ser. No. 08/395,745, which was filed on Feb. 28, 1995, and entitled "Cell Processing for Voice Transmission," and which is incorporated herein by reference.

The AAL 916 obtains from the control interface 904 the virtual path identifier (VPI) and the virtual channel identifier (VCI) for each DS0 for each call connection. The AAL 916 also obtains the identity of the DS0 for each call (or the DS0s for an Nx64 call). The AAL 916 then transfers the communication device information between the identified DS0 and the identified ATM virtual connection. An acknowledgment that the assignments have been implemented may be sent to the signaling processor 922 if desired. Calls with multiple 64 Kilo-bits per second (Kbps) DS0s are known as Nx64 calls. If desired, the AAL 916 can be configured to accept control messages through the control interface 904 for Nx64 calls.

As discussed above, the ATM interworking unit 902 also handles calls in the opposite direction, that is, in the direction from the OC-M/STS-M interface 918 to the DS0 interface 912, including calls exiting from the DS1 interface. 910, the DS3 interface 908, the OC-N/STS-N interface 906, and the ISDN/GR-303 interface 920. For this traffic, the VPI/VCI has been selected already and the traffic has been routed through the cross-connect (not shown). As a result, the AAL 916 only needs to identify the pre-assigned DS0 for the selected VPI/VCI. This can be accomplished through a look-up table. In alternative embodiments, the signaling processor 922 can provide this DS0-VPI/VCI assignment through the control interface 904 to the AAL 916.

A technique for processing VPI/VCIs is disclosed in U.S. patent application Ser. No. 08/653,852, which was filed on May 28, 1996, and entitled "Telecommunications System with a Connection Processing System;" and which is incorporated herein by reference.

DS0 connections are bi-directional and ATM connections are typically uni-directional. As a result, two virtual connections in opposing directions typically will be required for each DS0. Those skilled in the art will appreciate how this can be accomplished in the context of the invention. For example, the cross-connect can be provisioned with a second set of VPI/VCIs in the opposite direction as the original set of VPI/VCIs. For each call, ATM interworking multiplexers would be configured to invoke automatically this second VPI/VCI to provide a bi-directional virtual connection to match the bi-directional DS0 on the call.

In some embodiments, it may be desirable to incorporate digital signal processing capabilities at the DS0 level. It may also be desired to apply echo cancellation to selected DS0 circuits. In these embodiments, a signal processor 914 would be included either separately (as shown) or as a part of the DS0 interface 912. The signaling processor 922 would be configured to send control messages to the ATM interworking unit 902 to implement particular features on particular DS0 circuits. Alternatively, lookup tables may be used to implement particular features for particular circuits or VPIs/VCIs.

Figure 10:
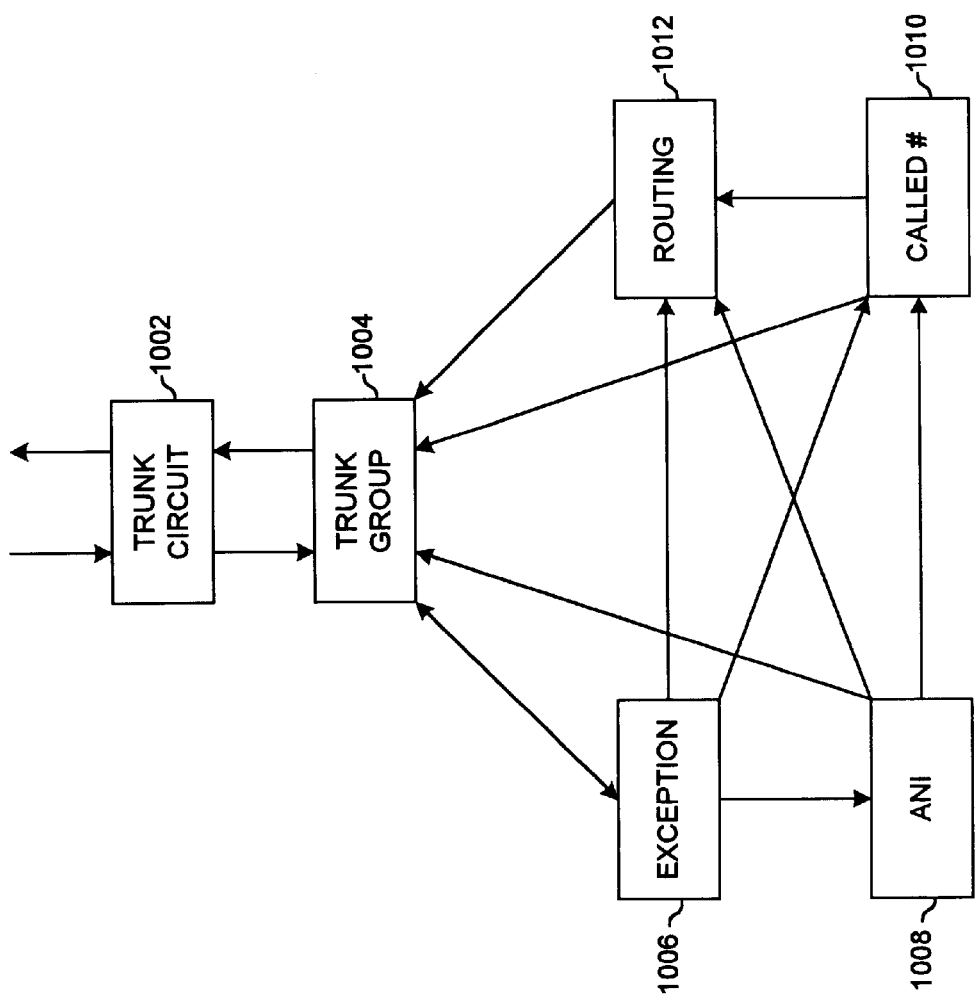
FIG. 10 is a block diagram of additional tables that are used in the signaling processor of FIG. 9.

FIG. 10 shows another embodiment of an interworking unit which is an ATM interworking unit 1002 suitable for the present invention. The ATM interworking unit 902 may receive and transmit in-band and out-of-band calls.

The ATM interworking unit 1002 is for use with an SDH system and has a control interface 1004, an STM-N electrical/optical (E/O) interface 1006, an E3 interface 1008, an E1 interface 1010, an E0 interface 1012, a signal processor 1014, an ATM adaptation layer (AAL) 1016, an STM-M electrical/optical (E/O) interface 1018, and a digital private network signaling system (DPNSS) interface 1020. As used herein in conjunction with STM, "N" refers to an integer, and "M" refers to an integer.

The control interface 1004 accepts control messages from the signaling processor 1022. In particular, the control interface 1004 identifies E0 connections and virtual connection assignments in the control messages from the signaling processor 1022. These assignments are provided to the AAL 1016 for implementation.

The STM-N E/O interface 1006, the E3 interface 1008, the E1 interface 1010, the E0 interface 1012, and the DPNSS interface 1020 each can accept calls, including user communications, from a second communication device 1024. Likewise, the STM-M E/O interface 1018 can accept calls, including user communications, from a third communication device 1026.

The STM-N E/O interface 1006 accepts STM-N electrical or optical formatted calls and converts the calls from the STM-N electrical or STM-N optical format to the E3 format. The E3 interface 1008 accepts calls in the E3 format and converts the calls to the E1 format. The E3 interface 1008 can accept E3s from the STM-N E/O interface 1006 or from an external connection. The E1 interface 1010 accepts the calls in the E1 format and converts the calls to the E0 format. The E1 interface 1010 can accept E1s from the STM-N E/O interface 1006 or the E3 interface 1008 or from an external connection. The E0 interface 1012 accepts calls in the E0 format and provides an interface to the AAL 1016. The DPNSS interface 1020 accepts calls in the DPNSS format and converts the calls to the E0 format. In addition, each interface may transmit signals in a like manner to the communication device 1024.

The STM-M E/O interface 1018 is operational to accept ATM cells from the AAL 1016 and to transmit the ATM cells over the connection to the communication device 1026. The STM-M E/O interface 1018 may also accept ATM cells in the STM-M E/O format and transmit them to the AAL 1016.

The AAL 1016 comprises both a convergence sublayer and a segmentation and reassembly (SAR) sublayer. The AAL 1016 is operational to accept communication device information in the E0 format from the E0 interface 1012 and to convert the communication device information into ATM cells.

The AAL 1016 obtains from the control interface 1004 the virtual path identifier and the virtual channel identifier for each call connection. The AAL 1016 also obtains the identity of each call. The AAL 1016 then transfers the communication device information between the identified E0 and the identified ATM virtual connection. An acknowledgment that the assignments have been implemented may be sent back to the signaling processor 1022 if desired. If desired, the AAL 1016 can be configured to accept control messages through the control interface 1004 for Nx64 calls.

As discussed above, the ATM interworking unit 1002 also handles calls in the opposite direction, that is, in the direction from the STM-M E/O interface 1018 to the E0 interface 1012, including calls exiting from the E1 interface 1010, :the E3 interface 1008, the STM-N E/O interface 1006, and the DPNSS interface 1020. For this traffic, the VPI/VCI has been selected already and the traffic has been routed through the cross-connect (not shown). As a result, the AAL 1016 only needs to identify the pre-assigned E0 for the selected VPI/VCI. This can be accomplished through a look-up table. In alternative embodiments, the signaling processor 1022 can provide this VPI/VCI assignment through the control interface 1004 to the AAL 1016.

E0 connections are bi-directional and ATM connections typically are uni-directional. As a result, two virtual connections in opposing directions typically will be required for each E0. Those skilled in the art will appreciate how this can be accomplished in the context of the invention. For example, the cross-connect can be provisioned with a second set of VPI/VCIs in the opposite direction as the original set of VPI/VCIs. For each call, ATM interworking multiplexers would be configured to automatically invoke this second VPI/VCI to provide a bi-directional virtual connection to match the bi-directional E0 on the call.

In some instances, it may be desirable to incorporate digital signal processing capabilities at the E0 level. Also, it may be desirable apply echo cancellation. In these embodiments, a signal processor 1014 would be included either separately (as shown) or as a part of the E0 interface 1012. The signaling processor 1022 would be configured to send control messages to the ATM interworking unit 1002 to implement particular features on particular circuits. Alternatively, lookup tables may be used to implement particular features for particular circuits or VPIs/VCIs.

The Signaling Processor

The signaling processor is referred to as a call/connection manager (CCM), and it receives and processes telecommunications call signaling and control messages to select connections that establish communication paths for calls. In the preferred embodiment, the CCM processes ISDN, GR-303, and SS7signaling to select connections for a call. CCM processing is described in a U.S. Patent Application Ser. No. 08/754,349, which is entitled "Telecommunication System," which is assigned to the same assignee as this patent application, and which is incorporated herein by reference.

In addition to selecting connections, the CCM performs many other functions in the context of call processing. It not only can control routing and select the actual connections, but it also can validate callers, control echo cancelers, generate billing information, invoke intelligent network functions, access remote databases, manage traffic, and balance network loads. One skilled in the art will appreciate how the CCM described below can be adapted to operate in the above embodiments.

Figure 11:
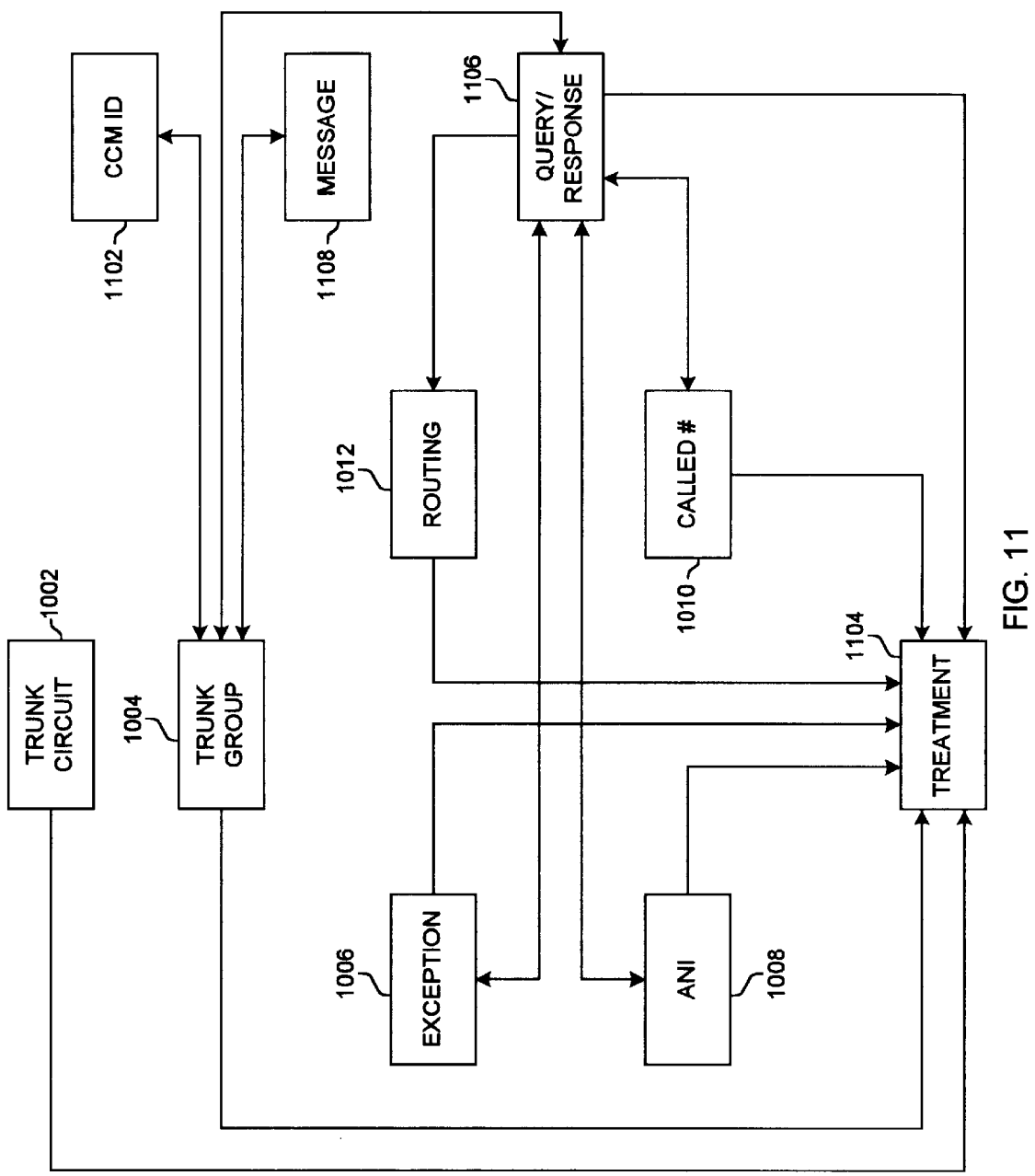
FIG. 11 is a table diagram of a trunk circuit table used in the signaling processor of FIG. 9.

FIG. 11 depicts a version of the CCM. Other versions also are contemplated. In the embodiment of FIG. 11, the CCM 1102 controls an ATM interworking unit, such as an ATM interworking multiplexer (mux) that performs interworking of DS0s and VPI/VCIs. However, the CCM may control other communications devices and connections in other embodiments.

The CCM 1102 comprises a signaling platform 1104, a control platform 1106, and an application platform 1108. Each of the platforms 1104, 1106, and 1108 is coupled to the other platforms.

The signaling platform 1104 is externally coupled to the signaling systems—in particular to SS7 signaling systems having a message transfer part (MTP), an ISDN user part (ISUP), a signaling connection control part (SCCP), an intelligent network application part (INAP), and a transaction capabilities application part (TCAP). The control platform 1106 is externally coupled to an interworking unit control, an echo control, a resource control, billing, and operations.

The signaling platform 1104 preferably is an SS7 platform that comprises MTP levels 1–3, ISUP, TCAP, SCCP, and INAP functionality and is operational to transmit and receive the SS7 messages. The ISUP, SCCP, INAP, and TCAP functionality use MTP to transmit and receive the SS7 messages. Together, this functionality is referred as an "SS7 stack," and it is well known. The software required by one skilled in the art to configure an SS7 stack is commercially available, for example, from the Trillium company.

The control platform 1106 is comprised of various external interfaces including an interworking unit interface, an echo interface, a resource control interface, a billing interface, and an operations interface. The interworking unit interface exchanges messages with at least one interworking unit. These messages comprise DS0 to VPI/VCI assignments, acknowledgments, and status information. The echo control interface exchanges messages with echo control systems. Messages exchanged with echo control systems might include instructions to enable or disable echo cancellation on particular DS0s, acknowledgments, and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to send and detect a tone for a continuity test.

The billing interface transfers pertinent billing information to a billing system. Typical billing information includes the parties to the call, time points for the call, and any special features applied to the call. The operations interface allows for the configuration and control of the CCM 1102. One skilled in the art will appreciate how to produce the software for the interfaces in the control platform 1106.

The application platform 1108 is functional to process signaling information from the signaling platform 1104 in order to select connections. The identity of the selected connections are provided to the control platform 1106 for the interworking unit interface. The application platform 1108 is responsible for validation, translation, routing, call control, exceptions, screening, and error handling. In addition to providing the control requirements for the interworking unit, the application platform 1108 also provides requirements for echo control and resource control to the appropriate interface of the control platform 1106. In addition, the application platform 1108 generates signaling information for transmission by the signaling platform 1104. The signaling information might be ISUP, INAP, or TCAP messages to external network elements. Pertinent information for each call is stored in a call control block (CCB) for the call. The CCB can be used for tracking and billing the call.

The application platform 1108 operates in general accord with the Basic Call Model (BCM) defined by the ITU. An instance of the BCM is created to handle each call. The BCM includes an originating process and a terminating process. The application platform 1108 includes a service switching function (SSF) that is used to invoke the service control function (SCF). Typically, the SCF is contained in a service control point (SCP). The SCF is queried with TCAP or INAP messages. The originating or terminating processes will access remote databases with intelligent network (IN) functionality via the SSF function.

Software requirements for the application platform 1108 can be produced in specification and description language (SDL) defined in ITU-T Z. 100. The SDL can be converted into C code. Additional C and C++ code can be added as required to establish the environment.

The CCM 1102 can be comprised of the above-described software loaded onto a computer. The computer can be an Integrated Micro Products (IMP) FT-Sparc 600 using the Solaris operating system and conventional database systems. It may be desirable to utilize the multi-threading capability of a Unix operating system.

From FIG. 11, it can be seen that the application platform 1108 processes signaling information to control numerous systems and facilitate call connections and services. The SS7 signaling is exchanged with external components through the signaling platform 1104, and control information is exchanged with external systems through the control platform 1106. Advantageously, the CCM 1102 is not integrated into a switch central processing unit (CPU) that is coupled to a switching matrix. Unlike an SCP, the CCM 1102 is capable of processing ISUP messages independently of TCAP queries.

SS7 Message Designations

SS7 messages are well known. Designations for various SS7 messages commonly are used. Those skilled in the art are familiar with the following message designations:

ACM—Address Complete Message
ANM—Answer Message
BLO—Blocking
BLA—Blocking Acknowledgment
CPG—Call Progress
CRG—Charge Information
CGB—Circuit Group Blocking
CGBA—Circuit Group Blocking Acknowledgment
GRS—Circuit Group Reset
GRA—Circuit Group Reset Acknowledgment
CGU—Circuit Group Unblocking
CGUA—Circuit Group Unblocking Acknowledgment
CQM—Circuit Group Query
CQR—Circuit Group Query Response
CRM—Circuit Reservation Message
CRA—Circuit Reservation Acknowledgment
CVT—Circuit Validation Test
CVR—Circuit Validation Response
CFN—Confusion
COT—Continuity
CCR—Continuity Check Request
EXM—Exit Message
INF—Information
INR—Information Request
IAM—Initial Address
LPA—Loop Back Acknowledgment
PAM—Pass Along
REL—Release
RLC—Release Complete
RSC—Reset Circuit
RES—Resume
SUS—Suspend
UBL—Unblocking
UBA—Unblocking Acknowledgment
UCIC—Unequipped Circuit Identification Code.

CCM Tables

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

FIG. 12 depicts a data structure used by the application platform 1108 to execute the BCM. This is accomplished through a series of tables that point to one another in various ways. The pointers are typically comprised of next function and next index designations. The next function points to the next table, and the next index points to an entry or a range of entries in that table. The data structure has a trunk circuit table 1202, a trunk group table 1204, an exception table 1206, an ANI table 1208, a called number table 1210, and a routing table 1212.

The trunk circuit table 1202 contains information related to the connections. Typically, the connections are DS0 or ATM connections. Initially, the trunk circuit table 1202 is used to retrieve information about the originating connection. Later, the table is used to retrieve information about the terminating connection. When the originating connection is being processed, the trunk group number in the trunk circuit table 1202 points to the applicable trunk group for the originating connection in the trunk group table 1204.

The trunk group table 1204 contains information related to the originating and terminating trunk groups. When the originating connection is being processed, the trunk group table 1204 provides information relevant to the trunk group for the originating connection and typically points to the exception table 1206.

The exception table 1206 is used to identify various exception conditions related to the call that may influence the routing or other handling of the call. Typically, the exception table 1206 points to the ANI table 1208. Although, the exception table 1206 may point directly to the trunk group table 1204, the called number table 1210, or the routing table 1212.

The ANI table 1208 is used to identify any special characteristics related to the caller's number. The caller's number is commonly known as automatic number identification (ANI). The ANI table 1208 typically points to the called number table 1210. Although, the ANI table 1208 may point directly to the trunk group table 1204 or the routing table 1212.

The called number table 1210 is used to identify routing requirements based on the called number. This will be the case for standard telephone calls. The called number table 1210 typically points to the routing table 1212. Although, it may point to the trunk group table 1204.

The routing table 1212 has information relating to the routing of the call for the various connections. The routing table 1212 is entered from a pointer in the exception table 1206, the ANI table 1208, or the called number table 1210. The routing table 1212 typically points to a trunk group in the trunk group table 1204.

When the exception table 1206, the ANI table 1208, the called number table 1210, or the routing table 1212 point to the trunk group table 1204, they effectively select the terminating trunk group. When the terminating connection is being processed, the trunk group number in the trunk group table 1204 points to the trunk group that contains the applicable terminating connection in the trunk circuit table 1204.

The terminating trunk circuit is used to extend the call. The trunk circuit is typically a VPI/VCI or a DS0. Thus, it can be seen that by migrating through the tables, a terminating connection can be selected for a call.

FIG. 13 is an overlay of FIG. 12. The tables from FIG. 12 are present, but for clarity, their pointers have been omitted. FIG. 13 illustrates additional tables that can be accessed from the tables of FIG. 12. These include a CCM ID table 1302, a treatment table 1304, a query/response table 1306, and, a message table 1308.

The CCM ID table 1302 contains various CCM SS7 point codes. It can be accessed from the trunk group table 1204, and it points back to the trunk group table 1204.

The treatment table 1304 identifies various special actions to be taken in the course of call processing. This will typically result in the transmission of a release, message (REL) and a cause value. The treatment table 1304 can be accessed from the trunk circuit table 1202, the trunk group table 1204, the exception table 1206, the ANI table 1208, the called number table 1210, the routing table 1212, and the query/response table 1306.

The query/response table 1306 has information used to invoke the SCF. It can be accessed by the trunk group table 1204, the exception table 1206, the ANI table 1208, the called number table 1210, and the routing table 1212. It points to the trunk group table 1204, the exception table 1206, the ANI table 1208, the called number table 1210, the routing table 1212, and the treatment table 1304.

The message table 1308 is used to provide instructions for messages from the termination side of the call. It can be accessed by the trunk group table 1204 and points to the trunk group table 1204.

FIGS. 14–21 depict examples of the various tables described above. FIG. 14 depicts an example of the trunk circuit table. Initially, the trunk circuit table is used to access information about the originating circuit. Later in the processing, it is used to provide information about the terminating circuit. For originating circuit processing, the associated point code is used to enter the table. This is the point code of the switch or CCM associated with the originating circuit. For terminating circuit processing, the trunk group number is used to enter the table.

The table also contains the circuit identification code (CIC). The CIC identifies the circuit which is typically a DS0 or a VPI/VCI. Thus, the invention is capable of mapping the SS7 CICs to the ATM VPI/VCI. If the circuit is ATM, the virtual path (VP) and the virtual channel (VC) also can be used for identification. The group member number is a numeric code that is used for terminating circuit selection. The hardware identifier identifies the location of the hardware associated with the originating circuit. The echo canceler (EC) identification (ID) entry identifies the echo canceler for the originating circuit.

The remaining fields are dynamic in that they are filled during call processing. The echo control entry is filled based on three fields in signaling messages: the echo suppresser indicator in the IAM or CRM, the echo control device indicator in the ACM or CPM, and the information transfer capability in the LAM. This information is used to determine if echo control is required on the call. The satellite indicator is filled with the satellite indicator in the IAM or CRM. It may be used to reject a call if too many satellites are used. The circuit status indicates if the given circuit is idle, blocked, or not blocked. The circuit state indicates the current state of the circuit, for example, active or transient. The time/date indicates when the idle circuit went idle.

FIG. 15 depicts an example of the trunk group table. During origination processing, the trunk group number from the trunk circuit table is used to key into the trunk table. Glare resolution indicates how a glare situation is to be resolved. Glare is dual seizure of the same circuit. If the glare resolution entry is set to "even/odd," the network element with the higher point code controls the even circuits, and the network element with the lower point code controls the odd circuits. If the glare resolution entry is set to "all," the CCM controls all of the circuits. If the glare resolution entry is set to "none," the CCM yields. The continuity control entry lists the percent of calls requiring continuity tests on the trunk group.

The common language location identifier (CLLI) entry is a Bellcore standardized entry. The satellite trunk group entry indicates that the trunk group uses a satellite. The satellite trunk group entry is used in conjunction with the satellite indicator field described above to determine if the call has used too many satellite connections and, therefore, must be rejected. The service indicator indicates if the incoming message is from a CCM (ATM) or a switch (TDM). The outgoing message index (OMI) points to the message table so that outgoing messages can obtain parameters. The associated number plan area (NPA) entry identifies the area code.

Selection sequence indicates the methodology that will be used to select a connection. The selection sequence field designations tell the trunk group to select circuits based on the following: least idle, most idle, ascending, descending, clockwise, and counterclockwise. The hop counter is decremented from the IAM. If the hop, counter is zero, the call is released. Automatic congestion control (ACC) active indicates whether or not congestion control is active. If automatic congestion control is active, the CCM may release the call. During termination processing, the next function and index are used to enter the trunk circuit table.

FIG. 16 depicts an example of the exception table. The index is used as a pointer to enter the table. The carrier selection identification (ID) parameter indicates how the caller reached the network and is used for routing certain types of calls. The following are used for this field: spare or no indication, selected carrier identification code presubscribed and input by the calling party, selected carrier identification code presubscribed and not input by the calling party, selected carrier identification code presubscribed and no indication of input by the calling party, and selected carrier identification code not presubscribed and input by the calling party. The carrier identification (ID) indicates the network that the caller wants to use. This is used to route calls directly to the desired network. The called party number nature of address differentiates between 0+ calls, 1+ calls, test calls, and international calls. For example, international calls might be routed to a pre-selected international carrier.

The called party "digits from" and "digits to" focus further processing unique to a defined range of called numbers. The "digits from" field is a decimal number ranging from 1–15 digits. It can be any length and, if filled with less than 15 digits, is filled with 0s for the remaining digits. The "digits to" field is a decimal number ranging from 1–15 digits. It can be any length and, if filled with less than 15 digits, is filled with 9s for the remaining digits. The next function and next index entries point to the next table which is typically the ANI table.

FIG. 17 depicts an example of the ANI table. The index is used to enter the fields of the table. The calling party category differentiates among types of calling parties, for example, test calls, emergency calls, and ordinary calls. The calling party charge number entry nature of address indicates how the ANI is to be obtained. The following is the table fill that is used in this field: unknown, unique subscriber numbers, ANI not available or not provided, unique national number, ANI of the called party included, ANI of the called party not included, ANI of the called party includes national number, non-unique subscriber number, non-unique national number, non-unique international number, test line test code, and all other parameter values.

The "digits from" and "digits to" focus further processing unique to ANI within a given range. The data entry indicates if the ANI represents a data device that does not need echo control. Originating line information (OLI) differentiates among ordinary subscriber, multiparty line, ANI failure, station level rating, special operator handling, automatic identified outward dialing, coin or non-coin call using database access, 800\888 service call, coin, prison/inmate service, intercept (blank, trouble, and regular), operator handled call, outward wide area telecommunications service, telecommunications relay service (TRS), cellular services, private paystation, and access for private virtual network types of service. The next function and next index point to the next table which is typically the called number table.

FIG. 18 depicts an example of the called number table. The index is used to enter the table. The called number nature of address entry indicates the type of dialed number, for example, national versus international. The "digits from" and "digits to" entries focus further processing unique to a range of called numbers. The processing follows the processing logic of the "digits from" and "digits to" fields in FIG. 16. The next function and next index point to the next table which is typically the routing table.

FIG. 19 depicts an example of the routing table. The index is used to enter the table. The transit network selection (TNS) network identification (ID) plan indicates the number of digits to use for the CIC. The transit network selection "digits from" and "digits to" fields define the range of numbers to identify an international carrier. The circuit code indicates the need for an operator on the call. The next function and next index entries in the routing table are used to identify a trunk group. The second and third next function/ index entries define alternate routes. The third next function entry can also point back to another set of next functions in the routing table in order to expand the number of alternate route choices. The only other entries allowed are pointers to the treatment table. If the routing table points to the trunk group table, then the trunk group table typically points to a trunk circuit in the trunk circuit table. The yield from the trunk circuit table is the terminating connection for the call.

It can be seen from FIGS. 14–19 that the tables can be configured and relate to one another in such a way that call processes can enter the trunk circuit table for the originating connection and can traverse through the tables by keying on information and using pointers. The yield of the tables is typically a terminating connection identified by the trunk circuit table. In some cases, treatment is specified by the treatment table instead of a connection. If, at any point during the processing, a trunk group can be selected, processing may proceed directly to the trunk group table for terminating circuit selection. For example, it may be desirable to route calls from a particular ANI over a particular set of trunk groups. In this case, the ANI table would point directly to the trunk group table, and the trunk group table would point to the trunk circuit table for a terminating circuit. The default path through the tables is: trunk circuit, trunk group, exception, ANI, called number, routing, trunk group, and trunk circuit.

Those skilled in the art will appreciate that variations from the specific embodiments disclosed above are contemplated by the invention. The invention should not be restricted to the above embodiments, but should be measured by the following claims.

What is claimed is:

1. A system for connecting a call having user communications and call signaling, the system comprising:
   a signaling processor adapted to receive and process the call signaling to transfer a first control message using a protocol to assure delivery;
   an interworking unit adapted to receive the user communications and the first control message and interwork and transfer the user communications in response to the first control message;
   an asynchronous connection device adapted to receive the first control message from the signaling processor over a first link and transfer the first control message to the interworking unit over a second link;
   wherein there is another call having other user communications and other call signaling and the signaling processor is adapted to receive and process the other call signaling to transfer a second control message using the protocol to assure delivery, and further comprising a second interworking unit adapted to receive the other user communications and the second control message and interwork and transfer the other user communications in response to the second control message.

2. The system of claim 1 wherein the first link comprises a first ATM VPI/VCI and the second link comprises a second ATM VPI/VCI.

3. The system of claim 1 wherein the first link and the second link comprise a first ATM VPI/VCI.

4. The system of claim 1 wherein the interworking unit is adapted to receive and transfer the call signaling using the protocol to assure delivery.

5. The system of claim 4 wherein the call signaling received by the interworking unit comprises in-band signaling.

6. The system of claim 1 wherein the first control message comprises an ATM message.

7. The system of claim 1 wherein:
   the signaling processor is adapted to process the call signaling to select echo cancellation and indicate the echo cancellation in the first control message; and
   the interworking unit is adapted to cancel echo from the user communications in response to the first control message.

8. A system for connecting a call having user communications and call signaling, the system comprising:
   a signaling processor adapted to receive and process the call signaling to transfer a first control message using a protocol to assure delivery and to process the call signaling to select an identifier and indicate the identifier in the first control message;
   an interworking unit adapted to receive the user communications and the first control message and interwork the user communications into an asynchronous format with the identifier in response to the first control message and transfer the user communications in response to the first control message; and
   an asynchronous connection device adapted to transfer the first control message between the signaling processor and the interworking unit and transfer the user communications based on the identifier.

9. The system of claim 8 wherein the identifier identifies an ATM connection.

10. A method for connecting a call having user communications and call signaling, the method comprising:
    receiving and processing the call signaling in a signaling processor;
    in response to the processing, transferring a first control message from the signaling processor using a protocol to assure delivery;
    receiving the first control message into an asynchronous connection device from the signaling processor over a first link;
    transferring the first control message from the asynchronous connection device to the interworking unit over a second link;
    receiving the user communications and the first control message in an interworking unit;
    interworking and transferring the user communications from the interworking unit in response to the first control message;
    wherein there is another call having other user communications and other call signaling and further comprising:
    receiving and processing the other call signaling in the signaling processor;

in response to the other processing, transferring a second control message from the signaling processor using the protocol to assure delivery;

receiving the other user communications and the second control message in a second interworking unit; and interworking and transferring the other user communications from the second interworking unit in response to the third control message.

11. The method of claim 10 wherein the first control message comprises an ATM message.

12. The method of claim 10 wherein the first link comprises a first ATM VPI/VCI and the second link comprises a second ATM VPI/VCI.

13. The method of claim 10 wherein the first link and the second link comprise a first ATM VPI/VCI.

14. The method of claim 10 further comprising:

receiving the call signaling into the interworking unit; and transferring the call signaling from the interworking unit using the protocol to assure delivery.

15. The method of claim 14 wherein receiving the call signaling comprises receiving in-band signaling.

16. The method of claim 10 wherein the identifier identifies an ATM connection.

17. The method of claim 10 wherein:

processing the call signaling comprises selecting echo cancellation and indicating the echo cancellation in the first control message; and interworking the user communications comprises canceling echo from the user communications in response to the first control message.

18. A method for connecting a call having user communications and call signaling, the method comprising:

receiving and processing the call signaling to select an identifier in a signaling processor;

in response to the processing, transferring a first control message from the signaling processor using a protocol to assure delivery and indicating the identifier in the first control message;

transferring the first control message through an asynchronous connection device between the signaling processor and the interworking unit;

receiving the user communications and the first control message in an interworking unit;

interworking the user communications into an asynchronous format with the identifier in response to the first control message and transferring the user communications from the interworking unit in response to the first control message; and transferring the user communications through the asynchronous connection device based on the identifier.

* * * * *